US009600767B1

(12) United States Patent
Nogin et al.

(10) Patent No.: US 9,600,767 B1
(45) Date of Patent: Mar. 21, 2017

(54) SYSTEM, METHOD, AND COMPUTER PROGRAM PRODUCT FOR GENERATING A SINGLE SOFTWARE CODE BASED ON A DESCRIPTION OF A DISTRIBUTED ARCHITECTURE

(75) Inventors: Aleksey Nogin, Fresno, CA (US); Deepak Khosla, Camarillo, CA (US); Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1527 days.

(21) Appl. No.: 12/317,884

(22) Filed: Dec. 30, 2008

Related U.S. Application Data

(63) Continuation-in-part of application No. 11/801,377, filed on May 9, 2007, now abandoned, and a continuation-in-part of application No. 11/973,161, filed on Oct. 4, 2007, now Pat. No. 8,165,407.

(60) Provisional application No. 60/849,975, filed on Oct. 6, 2006, provisional application No. 60/903,241, filed on Feb. 23, 2007.

(51) Int. Cl.
*G06N 5/02* (2006.01)
*G06N 5/04* (2006.01)
*G06N 99/00* (2010.01)

(52) U.S. Cl.
CPC .............. *G06N 5/02* (2013.01); *G06N 5/04* (2013.01); *G06N 99/005* (2013.01)

(58) Field of Classification Search
USPC ........................................ 706/46, 11, 45, 62
See application file for complete search history.

(56) References Cited

U.S. PATENT DOCUMENTS

| 4,852,018 A | 7/1989 | Grossberg et al. |
| 5,040,214 A | 8/1991 | Grossberg et al. |
| 5,493,682 A * | 2/1996 | Tyra et al. .................... 717/122 |
| 5,920,718 A * | 7/1999 | Uczekaj ................... G06F 8/30 701/101 |
| 6,487,713 B1 * | 11/2002 | Cohen et al. ................. 717/105 |
| 2002/0199170 A1 * | 12/2002 | Jameson .......................... 7/120 |
| 2005/0065970 A1 * | 3/2005 | King et al. .................... 707/102 |
| 2005/0246685 A1 * | 11/2005 | Braddock ..................... 717/116 |

OTHER PUBLICATIONS

Michael Abato, Adrian Robert, Ajit Jagdale, and Daniel Gardner, "BRAINML: Layered Schemas to Support Neuroscience Data Sharing", Laboratory of Neuroinformatics, Department of Physiology and Biophysics, Weill Cornell Medical College, NYC, NY, BrainMI Poster (2004 Human Brain Project Tenth Anniversary Symposium).*

(Continued)

*Primary Examiner* — Ilya Traktovenko
(74) *Attorney, Agent, or Firm* — Tope-McKay & Associates

(57) ABSTRACT

The present invention relates to a system, method, and computer program product for generating a single software code based on a description of a distributed architecture. The present invention introduces a BICA-SMART development framework that implements a distributed architecture in a flexible, parallel and scalable implementation that is embodied by a single software code. Thus, using the present invention, a user can input a description of the architecture into the system, with the system automatically generating the software code to implement the architectural description.

18 Claims, 12 Drawing Sheets

(56) References Cited

OTHER PUBLICATIONS

Adrian Robert, Ajit Jagdale, and Daniel Gardner, "Neurodatabase Construction Kit: Data-Driven Methods Enable Data Sharing", Laboratory of Neuroinformatics, Department of Physiology and Biophysics, Weill Cornell Medical College, NYC, NY, Neurodatabase Construction Kit Poster (2004 Society for Neuroscience Annual Meeting).*
Sivakumar, "C++ /CLI Properties—Syntactic sugar for accessor methods", May 11, 2005.*
R.D.S. Raizada, et al., "Towards a theory of the laminar architecture of cerebral cortex: Computational clues from the visual system," Cerebral Cortex, 13, 100-113, 2003.
J.W. Brown, et al., "How laminar frontal corex and basal ganglia circuits interact to control planned and reactive saccades," Neural Networks, 17, 471-510, 2004.
S. Grossberg, "The link between brain learning, attention, and consciousness," Consciousness and Cognition, vol. 8, pp. 1-44, 1999.
G.A. Carpenter, et al., "A massively parallel architecture for a self-organizing neural pattern recognition machine," Computer Vision, Graphics and Image Processing, vol. 37, pp. 54-115, 1987.
D. Bullock, et al., "A self-organizing neural model of motor equivalent reaching and tool use by a multijoint arm," Journal of Cognitive Neuroscience, vol. 5, pp. 408-435, 1993.
V. Navalpakkam, et al., "Modeling the influence of task on attention," Vision Research, vol. 45, pp. 205-231, 2005.
S. Grossberg, et al., "A neural network model of adaptively timed reinforcement learning and hippocampal dynamics," Cognitive Brain Research, vol. 1, pp. 3-38, 1992.
S. Grossberg, et al., "The resonant dynamics of speech perception: Interword integration and duration-dependent backward effects," Psychological Review, (4), 735-767, 2000.
M. Aribib, et al., "Neural expectations: a possible evolutionary path from manual skills to language," Communication and Cognition, vol. 29, pp. 393-424, 1997. [Reprinted in Ph. Van Loocke (ed.) The nature, representation and evolution of concepts, London/New York: Routledge].
J.R. Anderson, "Rules of the Mind," Hillsdale, NJ: Lawrence Erlbaum Associates.
Laird, J.E., Newell, A., & Rosenbloom, P.S. (1987), SOAR: An architecture for general intelligence. Artificial Intelligence, 33, 1-64.
R. Hecht-Nielsen, et al., "A theory of Thalamocortex," Computational Models for Neuroscience—Human Cortical Information Processing, Springer, 2003.
Lansner, "Detailed simulation of large scale neural networks," Computational Neuroscience: Trends in Research 1997, J.M. Bower, Boston, MA, Plenum Press: 931-935, 1997.
O. Sporns, R. Kotter, "Motifs in brain networks," PLoS Biology 2, 1910-1918, 2004.
J. Anderson, "A brain like computer for cognitive applications: the ersatz brain project," Powerpoint file, http://www.cog.brown.edu/Research/ErsatzBrainGroup/presentations.html.
S. Grossberg, "Bring ART into ACT," Behavioral and Brain Sciences, 26:5, 610, 2003.
Stuart I. Feldman. Make—a program for maintaining computer programs. Software—Practice and Experience, 9(4): 255-265, 1979.
Jason J. Hickey, et al., The OMake home page. http://omake.metaprl.org.
J. Hickey, et al., "OMake: Designing a scalable build process," In Fundamental Approaches to Software Engineering (FASE06), 2006.
R.M. Stallman, et al., "GNU Make: A program for directing recompilation," Free Software Foundation, Jul. 2002. http://www.gnu.org/software/make/manual/index.html.
B. Bacci, et al., "P3L: A structured high level programming language and its structured support," Concurrency: Practice and Experience, 7(3), 225-255, May 1995.
Murray Cole, "Algorithmic skeletons: structured management of parallel computation," MIT Press, Cambridge, MA, USA, 1991.
M. Danelutto, et al., "Parallel functional programming with skeletons: the OCaml P3L experiment," In Proceedings ACM workshop on ML and its applications. Cornell University, 1998.
R. Hecht-Nielsen, et al., "A theory of Thalamocortex," Computational Models for Neuroscience—Human Cortical Information Processing, Springer, 2003, chapter 4.
S. Lazebnik, C. Schmid, and J Ponce, "Beyond Bags of Features: Spatial Pyramid Matching for Recognizing Natural Scene Categories," in Proceedings of the institute of Electrical and Electronics Engineers (IEEE) Conference on Computer Vision and Pattern Recognition (CVPR). 2006,
H. Zhang, A. Berg, M. Maire, and J. Malik, "SVM-KNN: Discriminative Nearest Neighbor Classification for Visual Category Recognition," in Proc. IEEE CVPR, 2006.
G. Bradski, G. A. Carpenter, and S. Grossberg, "STORE working memory networks for storage and recall of arbitrary temporal sequences," Biological Cybernetics, vol. 71, pp. 469-490, 1994.
S. Grossberg and J. W. L. Merrill, "The Hippocampus arid cerebellum in adaptively timed learning, recognition and movement," Journal of Cognitive Neuroscience, vol. 8, pp. 257-277, 1996.
G. A. Carpenter, S. Grossberg, "ART2: Stable self-organization of pattern recognition codes for analog input patterns," Applied Optios, vol. 26, pp. 4919-4930, 1987.
G. A. Carpenter, S. Grossberg, and G W. Lesher, "The What-and-Where Filter," Computer Vision ad image Understanding, vol. 69, No. 1,pp. 1-22, 1998.
G. A. Carpenter, S. Grossberg J.H, Reynolds "ARTMAP: Supervised real-time learning and classification of nonstanoriary data by self-organizing neural network," Neural Networks, vol, 4, pp. 1330-1336, 1995.
G. A. Carpenter and W. D, Ross, "ART-EMAP:A neural network architectute for object recognition by evidence accumulation," IEEE Transactions on Neural Networks, vol. 6, pp. 805-816, 1995.
S. Grossberg, I. Boardman, and M. Cohen, "Neural dynamics of variable-rate speech categorization," Journal of Experimental Psychology, 23:418-503, 1997.
Y. R. Asfour, G. A. Carpenter, S. Grossberg, and C. Lesher, "Fusion ARTMAP:A neural network architecture for multi-channel data fusion and classification," Proceedings of the world congress on neural networks, vol. II, pp. 210-215, Hillsdale, NJ: Erlbaum Associates, 1993.
F. H. Guenther, "A neural network model of speech acquisition and motor equivalent speech production," Biological Cybernetcs, 72, 43-53, 1994.
S. Grossberg, S., "Resonant neural dynamics of speech perception," Journal of Phonetics. vol. 31. pp. 423-445, 2003.
Y. R. Asfour, G. A. Carpenter, and S. Grossberg, Landsat image segmentation using the fuzzy ARTMAP neural network. Technical Report CAS/CNS-TR-95-004, Boston University. In Proceedings of the world congress on neural networks, Washington, 1995.
Y. R. Asfour, G. A. Carpenter, S. Grossberg, and G. Lesher, "Fusion ARTMAP:A neural network architecture for multi-channel data fusion and classification," Proceedings of the world congress on neural networks, vol. II, pp. 210-215, Hillsdale, NJ: Erlbaum Associates, 1993.
G. A. Carpenter, M. A. Rubin, & W. W. Streilein, "ARTMAP-FD: Familiarity discrimination applied to radar target recognition," Proceedings of the International Conference on Neural Networks (ICNN'97), 3, Piscataway, NJ: IEEE Press, 1459-1464, 1997. Technical Report CAS/CNS TR-96-032, Boston, MA: Boston University.
G. A. Carpenter, and N. Markuzon, ARTMAP-IC and medical diagnosis: Instance counting and inconsistent cases. Neural Networks, vol. 11, pp. 323-336, 1998.
G. A. Carpenter & W. W. Streilein, "ARTMAP-FTR: A neural network for fusion target recognition, with application to sonar classification," AeroSense: Proceedings of SPIE's 12th Annual Symposium on Aerospace/Defense Sensing, Simulation, and Control. Orlando, Apr. 13-17, 1998.

(56) References Cited

OTHER PUBLICATIONS

G. A. Carpenter, B. Milenova, & B. Noeske, "dARTMAP: A neural network for fast distributed supervised learning," Neural Networks, vol. 11, 793-813, 1998.
G. A. Carpenter, G.A. & F. D. M. Wilson, "ARTMAP-DS: Pattern discrimination by discounting similarities," In W. Gerstner, A. Germond, M. Hasler, & J.-D. Nicoud (Eds.), Proceedingsof the International Conference on Artificial Neural Networks (ICANN'97), Berlin: Springer-Verlag, 607-612, 1997.
S. Martens, P. Gaudiano, & G. A. Carpenter, "Mobile robot sensor fusion with fuzzy ARTMAP," Proceedings of the 1998 IEEE International Symposium on Computational Intelligence in Robotics and Automation (ISIC/CIRA/ISAS'98), Piscataway, NJ: IEEE Press, 307-312, 1998.
A. A. Baloch, and A. M. Waxman, "Visual learning, adaptive expectations, and behavioral conditioning of the mobile robot MAVIN," Neural Networks, vol. 4, pp. 271-302, 1991.
G. A. Carpenter and S. Grossberg, "Fuzzy ARTMAP: Supervised learning, recognition and prediction by a self-organizing neural network," IEEE Communications Magazine, vol. 30, 38-49, 1992.
G. A. Carpenter, S. Grossberg, and J. H. Reynolds, "A fuzzy ARTMAP nonparametric probability estimator for nonstationary pattern recognition," IEEE Transactions on Neural Networks, vol. 6, 1330-1336, 1995.
G. A. Carpenter and A-H. Tan, "Rule extraction: From neural architecture to symbolic representation," Connection Science, vol. 7, pp. 3-27, 1995.
T. P. Caudell S. D. G. Smith R. Escobedo, and M. Anderson, (1994), "NIRS: Large-scale ART 1 neural architectures or engineering design retrieval," Neural Networks, vol. 7, 1339-1350, 1994.
A. Dubrawski, and J. L. Crowley, "Learning locomotion reflexes: A self-supervised neural system for a mobile robot," Robotics and Autonomous Systems, vol. 12, pp. 133-142, 1994.
R. O. Gjerdingen. "Categorization of musical patterns by self-organizing neuron like networks," Music Perception, vol. 7, pp. 339-370, 1990.
F. Ham, F. and S. Han, "Quantitative study of ARS complex using fuzzy ARTMAP and MIT/BIH arrythmia database," In Proceedings of the world congress on neural networks, vol. I, pp. 207-211, Hillsdale, NJ: Erlbaum Associates, 1993.
I. A. Bachelder, A. M. Waxman, and M. Seibert, "A neural system for mobile robot visual place learning and recognition," In Proceedings of the world congress on neural networks, vol. I, pp. 512-517, Hillsdale, NJ: Erlbaum Associates, 1993.
R. M. Harvey, "Nursing diagnostics by computers: An application of neural networks," Nursing Diagnostics, vol. 4, pp. 26-34, 1993.
J. Kasperkiewicz, J. Racz, and A. Dubrawski, "HPC strength prediction using artificial neural networks for development of diagnostic monitoring system in nuclear plants," ASCE Journal of Computing in Civil Engineering, 1994.
B. Metha, L. Vij, and L. Rabelo, "Prediction of secondary structures of proteins using fuzzy ARTMAP," In Proceedings of the world congress on neural networks, vol. I, pp. 228-232, Hillsdale, NJ: Erlbaum Associates, 1993.
M. M. Moya, M. W. Koch, and L. D. Hostetler, "One-class classifier networks for target recognition applications," In Proceedings of the world congress on neural networks, vol. III, pp. 797-801, Hillsdale, NJ: Erlbaum Associates, 1993.
M. Seibert, and A. M. Waxman, "Adaptive 3-D object recognition from multiple views," IEEE Transactions on Pattern Analysis and Machine Intelligence, vol. 14, 107-124, 1992.
Y. Suzuki, Y. Abe, and K. Ono, 'Self-organizing QRS wave recognition system in ECG using ART 2. In Proceedings of the world congress on neural networks, IV, pp. 39-42. Hillsdale, NJ: Erlbaum Associates, 1994.
D. Wienke, P. Xie, and P. K. Hopke, "An adaptive resonance theory based artificial neural network (ART 2A) for rapid identification of airborne particle shapes from their scanning electron microscopy images," Chemometrics and Intelligent Laboratory Systems, 1994.

N. Srinivasa and J. Ziegert, "Automated Measurement and Compensation of Thermally Induced Error Maps in Machine Tools," Precision Engineering, vol. 19, No. 2/3, pp. 112-132, Oct./Nov. 1996.
N. Srinivasa, and M. Jouaneh, "An Invariant Pattern Recognition Machine Using a Modified ART Architecture," IEEE Trans. on Systems, Man and Cybernetics, pp. 335-341, Sep./Oct. 1993.
N. Srinivasa and M. Jouaneh, "A Neural Network Model for Invariant Pattern Recognition," IEEE Trans. on Signal Processing, pp. 1595-1599, Jun. 1992.
B. Perrin, N. Ahuja and N. Srinivasa, "Learning Multiscale Image Models of Object Classes," Lecture Notes in Computer Vision, vol. 1352, pp. 323-331, Springer-Verlag, Jan. 1998.
N. Srinivasa and J. Ziegert, "Prediction of Thermally Induced Time-Variant Machine Tool Error Maps Using a Fuzzy ARTMAP Neural Network," ASME Journal of Manufacturing Science and Engineering, vol. 119, pp. 623-630, Nov. 1997.
N. Srinivasa, "Learning and Generalization of Noisy Mappings Using a Modified PROBART Neural Network," IEEE Trans. on Signal Processing, vol. 45, No. 10, pp. 2533-2550, Oct. 1997.
N. Srinivasa and N. Ahuja, "A Topological and Temporal Correlator Network for Spatio-Temporal Pattern Recognition and Recall," IEEE Transactions on Neural Networks, vol. 10, No. 2, pp. 356-371, Mar. 1999.
N. Srinivasa and S. Medasani, "Active Fuzzy Clustering for Collaborative Filtering," IEEE International Conference on Fuzzy Systems-FUZZIEEE, vol. 3, pp. 1697-1702, Budapest, Hungary, 2004.
S. Medasani, N. Srinivasa and Y. Owechko, "Active Learning System for Object Fingerprinting," International Joint Conference on Neural Networks-IJCNN, Budapest, vol. 1, pp. 345-350, Budapest, Hungary, 2004.
N. Srinivasa and M. Jouaneh, "An Investigation of Surface Roughness Characterization Using an ART2 Neural Network," In Symposium on Sensors, Controls and Quality Issues in Manufacturing, ASME Winter Annual Meeting, PED vol. 55, pp. 307-318, 1991, Atlanta, GA.
D. Greve, S. Grossberg, F. H. Guenther, and D. Bullock, Neural Representations for Sensory Motor control, I: Head-centered 3-D target positions from opponent eye-commands, Acta Psychologica, vol. 82, pp. 115-138, 1993.
Guenther, F.H., Bullock, D., Greve, D. and Grossberg, S., "Neural representations for sensory-motor control, III: Learning a body-centered representation of 3-D target position," J. Cognitive. Neurosciences, vol. 6, 341-358, 1994.
J. M. Foley, "Binocular distance perception," Psychological. Review, vol. 87, pp. 411-434, 1980.
P. Grobstein, "Directed movement in the frog: A closer look at a central representation of spatial location," In Visual Structure and Integrated Functions (Arbib, M.A. and Ewert, J.-P.,eds.), pp. 125-138, Springer-Verlag, 1991.
H. Sakata, H. Shibutani, and K. Kawano, "Spatial properties of visual fixation neurons in posterior parietal association cortex of the monkey," J. Neurophysiology, vol. 43, pp. 654-1672, 1980.
D. Bullock, S. Grossberg, and F. H. Guenther, "A self-organizing neural model of motor equivalent reaching and tool use by a multijoint arm," Journal of Cognitive Neuroscience, vol. 5, pp. 408-435, 1993.
D. Bullock, and S. Grossberg, "VITE and FLETE: Neural modules for trajectory formation and tension control," in Volitional Action, pp. 253-297, North-Holland, Amsterdam, 1989.
A. H. Fagg and M. A. Arbib, "Modeling parietal-premotor interactions in primate control of grasping," Neural Networks, vol. 11, No. 7-8, pp. 1277-1303, 1998.
A. Ulloa and D. Bullock, "A Neural Network simulating human reach-grasp coordination by continuous updating of vector positioning commands," Neural Networks, vol. 16, pp. 1141-1160, 2003.
A. Ulloa, D. Bullock and B. J. Rhodes, "Adaptive force generation for precision-grip lifting by a spectral timing model of the cerebellum," Neural Networks, vol. 16, pp. 521-528, 2003.
S. Grossberg. "A theory of human memory: Self-organization and performance of sensory-motor codes, maps, and plans," In R. Rosen

(56) References Cited

OTHER PUBLICATIONS and F. Snell (Eds.), Progress in theoretical biology, vol. 5. New York: Academic Press, 1978. Reprinted in S. Grossberg, Studies of mind and brain, Boston: Reidel Press, 1982.
G. Bradski, and S. Grossberg, A neural architecture for 3-D object recognition from multiple 2-D views. In Proceeding of the world congress on neural networks, vol. IV, pp. 211-219, Hillsdale, NJ: Erlbaum Associates, 1994.
G. Bradski, G. A. Carpenter, and S. Grossberg, "Working memory networks for learning temporal order with application to 3-D visual object recognition," Neural Computation, vol. 4, pp. 270-286, 1992.
M. A. Cohen, and S. Grossberg, "Neural dynamics of speech and language coding: Developmental programs, perceptual grouping, and competition for short term memory," Human Neurobiology, vol. 5, pp. 1-22, 1986.
M. A. Cohen, S. Grossberg, "Masking Fields: A massively parallel neural architecture for learning, recognizing, and predicting multiple groupings of patterned data," Applied Optics, vol. 26, pp. 1866-1891, 1987.
S. Grossberg, "Cortical dynamics of the three-dimensional form, color, and brightness perception: I. Monocular theory," Perception and Psychophysics, 41, 87-116, 1987.
S. Grossberg, "Cortical dynamics of the three-dimensional form, color, and brightness perception: II Binocular theory," Perception and Psychophysics, 41, 117-158, 1987.
S. Grossberg and E. Mingolla, "Neural dynamics of perceptual grouping: Textures, boundaries, and emergent segmentations," Perception and Psychophysics, 38, 141-171, 1985.
S. Grossberg and E. Mingolla, "Neural dynamics of surface perception: Boundary webs, illuminants, and shape-from-shading," CVGIP, 37, 116-165, 1987.
R. Desimone, "Neural circuits for visual attention in the primate brain," In G. A. Carpenter and S. Grossberg (Eds.), Neural Networks for vision and image processing (pp. 343-364). Cambridge, MA, MIT Press, 1992.
S. Grossberg, "The complementary brain: unifying brain dynamics and modularity," Trends in Cognitive Sciences, 4, 233-246, 2000.
S. Grossberg, "How does the cerebral cortex work? Learning, attention, and grouping by the laminar circuits of visual cortex," Spatial Vision, 12, 163-187, 1999.
R. D. S. Raizada and S. Grossberg, "Towards a theory of the laminar architecture of cerebral cortex: Computational clues from the visual system," Cerebral Cortex, 13, 100-113, 2003.
F. H. Guenther, "A neural network model of speech acquisition and motor equivalent speech production," Biological Cybernetics, 72, 43-53, 1994.
S. Grossberg, S., "Resonant neural dynamics of speech perception," Journal of Phonetics, vol. 31, pp. 423-445, 2003.
G. A. Carpenter, S. Grossberg, and C. Mehanian, "Invariant recognition of cluttered scenes by a self-organizing ART architecture: CORT-X boundary segmentation," Neural Networks, 2,169-181, 1989.
S. Grossberg and P.D.L. Howe, "A laminar cortical model of stereopsis and three-dimensional surface perception," Vision Research, 43(7), 801-829, 2003.
S. Grossberg, E. Mingolla, and W.D. Ross, "A neural theory of attentive vision search: interactions of boundary, surface, spatial, and object representations," Psychological Review, 101(3), 470-489, 1994.
S. Grossberg, I. Boardman, and M. Cohen, "Neural dynamics of variable-rate speech categorization," Journal of Experimental Psychology, 23:481-503, 1997.
S. Grossberg and C.W. Myers, "The resonant dynamics of speech perception: Interword integration and duration-dependent backward effects," Psychological Review, (4), 735-767, 2000.
G. Bradski and S. Grossberg, "Fast-Learning VIEWNET Architectures for Recognizing Three-dimensional Objects from Multiple Two-dimensional views," Neural Networks, 8(7/8), 1053-1080, 1995.
J. W. Brown, D. Bullock, and S. Grossberg, "How laminar frontal cortex and basal ganglia circuits interact to control planned and reactive saccades," Neural Networks, 17, 471-510, 2004.
S. Grossberg, K.K. Govindarajan, L. L. Wyse, and M. A. Cohen, "ARTSTREAM: a neural network model of auditory scene analysis and source segregation," Neural Networks, 17(4), 511-536, 2004.
E. A. DeYoe, D. C. Van Essen, "Concurrent processing streams in monkey visual cortex," Trends in Neurosciences, vol. 11, pp. 219-226, 1988.
P. Gaudiano and S. Grossberg, "Vector Associative Maps: Unsupervised real-time error-based learning and control of movement trajectories," Neural Networks, vol. 4, pp. 147-183, 1991.
D. Bullock and S. Grossberg, "The VITE model: A neural command circuit for generating arm and articulator trajectories," Dynamic Patterns in complex systems, pp. 305-326, World Scientific Publishers, Singapore, 1991.
S. Grossberg and J. W. L. Merrill, "The Hippocampus and cerebellum in adaptively timed learning, recognition and movement," Journal of Cognitive Neuroscience, vol. 8, pp. 257-277, 1996.
P. R. Roelfsema, V. H. F. Lamme, H. Spekreijse, "Object-based attention in primary visual cortex of the macaque monkey," Nature, vol. 395, pp. 376-381, 1998.
P. R. Roelfsema, and H. Spekreijse, "The representation of erroneously perceived stimuli in the primary visual cortex," Neuron, vol. 31, pp. 853-863, 2001.
D. H. Hubel and T. N. Wiesel, Functional architecture of macaque monkey visual cortex, Proc. Royal Society of London, vol. 198, pp. 1-59, 1977.
S. Grossberg, "Cortical Dynamics of three-dimensional figure-ground perception of two-dimensional pictures," Psychological Review, vol. 104, pp. 618-658, 1997.
L. Ohzawa, G. C. DeAngelis, R. D. Freeman, "Stereoscopic depth discrimination by the visual cortex: Neurons ideally suited as disparity detectors," Science, vol. 249, pp. 1037-1041, 1990.
R. von der Heydt, P. Hanny, M.R. Dursteler, "The role of orientation disparity in stereoscopic perception and the development of binocular correspondence," in Advances in Physiological Science, Sensory Functions, Pergamon Press, 1981.
S. Grossberg, "3-D vision and figure-ground separation by visual cortex," Perception and Psychophysics, vol. 55, pp. 48-120, 1994.
N. K. Logothetis, P.H. Schiller, E R. Charles and A. C. Hulbert, Perceptual deficits and the activity of the color-opponent and broad-band pathways at isoluminance, Science, vol. 247, pp. 214-217, 1990.
J. Chey, S. Grossberg, and E. Mingolla, "Neural Dynamics of motion grouping: From aperture ambiguity to object speed and direction," Journal Optical Society of America, vol. 14, pp. 2570-2594,1997.
L. G. Ungerleider and M. Mishkin, "Two cortical visual systems: Separation of appearance and location of objects," in Analysis of Visual Behavior, pp. 549-586, MIT Press, 1982.
M. Mishkin, L. G. Ungerleider and K. A. Macko, "Object vision and spatial vision: Two cortical pathways," Trends in Neurosciences, vol. 6, pp. 414-417, 1983.
M. A. Goodale and D. Milner, "Separate visual pathways for perception and action," Trends in Neurosciences, vol. 15, pp. 10-25, 1992.
S. Grossberg and M. Rudd, "Cortical dynamics of visual motion perception: Short-range and long-range apparent motion," Psychological Review, vol. 99, pp. 78-121, 1992.
G. A. Carpenter, S. Grossberg, and G. W. Lesher, "The What-and-Where Filter," Computer Vision ad Image Understanding, vol. 69, No. 1,pp. 1-22, 1998.
S. Grossberg, The link between brain learning, attention, and consciousness, Consciousness and Cognition, vol. 8, pp. 1-44, 1999.
A M. Sillito, H. E. Jones, G. L. Gerstein, and D. C. West, "Feature-linked synchronization of thalamic relay cell firing induced by feedback from the visual cortex," Nature, vol. 369, pp. 479-482, 1994.
G. A. Carpenter, S. Grossberg, "A massively parallel architecture for a self-organizing neural pattern recognition machine," Computer Vision, Graphics and Image Processing, vol. 37, pp. 54-115, 1987.

(56) References Cited

OTHER PUBLICATIONS

G. A. Carpenter, S. Grossberg, "ART2: Stable self-organization of pattern recognition codes for analog input patterns," Applied Optics, vol. 26, pp. 4919-4930, 1987.
G. A. Carpenter and S. Grossberg, "ART3: Hierarchical search using chemical transmitters in self-organizing pattern recognition architectures," Neural Networks, vol. 3, pp. 129-152, 1990.
G. A. Carpenter, S. Grossberg, J.H. Reynolds, "ARTMAP: Supervised real-time learning and classification of nonstationary data by self-organizing neural network," Neural Networks, vol. 4, pp. 1330-1336, 1995.
G. A. Carpenter and W. D. Ross, "ART-EMAP:A neural network architecture for object recognition by evidence accumulation," IEEE Transactions on Neural Networks, vol. 6, pp. 805-818, 1995.
M. Mishkin and T. Appenzeller, "The anatomy of memory," Scientific American, vol. 256, pp. 80-89, 1987.
M. Mishkin, B. Malamut, and J. Bachevalier, "Memories and Habits: Two neural systems," The neurobiology of learning and memory, pp. 287-296, New York, Guilford Press, 1984.
W. C. Drevets, H. Burton, and M. E. Raichle, "Blood flow changes in human somatosensory cortex during anticipated stimulation," Nature, 373, 249, 1995.
L. R. Squire, and N. J. Cohen, "Human memory and amnesia," In Neurobiology of learning and memory, New York, 1984.
L. R. Squire, and S. Zola-Morgan, "The medial temporal lobe memory system," Science, vol. 253, pp. 1380-1386, 1991.
H. Eichenbaum, T. Otto, and N. J. Cohen, "Two functional components of the hippocampal memory system," Behavioral and Brain Sciences, vol. 17, 449-472, 1994.
S. Grossberg, S. and G. O. Stone, G.O., Neural dynamics of word recognition and recall: Attentional priming, learning, and resonance. Psychological Review, vol. 93, pp. 46-74, 1986.
S. Grossberg, S. and G. O. Stone, "Neural dynamics of attention switching and temporal order information in short term memory," Memory and Cognition, vol. 14, 451-468, 1986.
G. Bradski, G. A. Carpenter, and S. Grossberg, "STORE working memory networks for storage and recall of arbitrary temporal sequences," Biological Cybernetics, vol. 71, pp. 469-480, 1994.
P. S. Goldman-Rakic, "The issue of memory in the study of prefrontal function," In A.M. Thierry, J. Glowsinski, P.S. Goldman-Rakic, and Y. Christen (Eds.), Motor and cognitive functions of the prefrontal cortex, New York: Springer-Verlag, pp. 112-121, 1994.
L. Itti, C. Koch and E. Neibur, "A Model of Saliency-Based Visual Attention for Rapid Scene Analysis," IEEE Transactions on Pattern Analysis and Machine Intelligence, vol. 20, No. 11, pp. 1254-1259, 1988.
L. Itti, and C. Koch, "Feature combination strategies for saliency-based visual attention systems," Journal of Electronic Imaging, vol. 10, No. 1, pp. 161-169, 2001.
L. Itti and C. Koch, "Computational modeling of visual attention," Nature Reviews Neuroscience, vol. 2, No. 3, pp. 194-203, 2001.
L. Itti and C. Koch, "A saliency-based search mechanism for overt and covert shifts of visual attention," Vision Research, vol. 40, No. 10, pp. 1489-1506, 2000.
V. Navalpakkam and L. Itti, "Modeling the Influence of task on attention," Vision Research, vol. 45, pp. 205-231, 2005.
A. R. Damasio, "Fundamental Feelings," Nature, pp. 413:781, 2001.
A R. Damasio, "The brain binds entities and events by multiregional activation from convergence zones," Neural Computation, vol. 1, pp. 123-132, 1989.
J. E. LeDoux, "Emotional memory systems in the brain," Behavioral Brain Research, vol. 58, pp. 69-79, 1993.
O. Hikosaka, "Role of Basal Ganglia in control of innate movements, learned behavior and cognition—a hypothesis," In G. Percheron, J. S. McKenzie and J. Feger (Eds), The Basal Ganglia, IV, New York, Plenum Press, pp. 589-595, 1994.
F. A. Middleton and P. L. Strick, "Anatomical evidence for cerebellar and basal ganglia involvement in higher cognitive function," Science, vol. 166, 1377-1379, 1994.
K. Sakai, O. Hikosaka, S. Miyauchi, R. Takino, Y. Sasaki and B. Putz, "Transition of brain activation from frontal to parietal areas in visuomotor sequence learning," Journal of Neuroscience, vol. 18, pp. 1827-1840, 1998.
S. Grossberg and W. Gutowski, "Neural dynamics of decision making under risk: Affective balance and cognitive-emotional interactions," Psychological Review, vol. 94, pp. 300-318, 1987.
J. Brown, D. Bullock, and S. Grossberg, "How the basal ganglia use parallel excitatory and inhibitory learning pathways to selectively respond to unexpected rewarding cues," Journal of Neuroscience, vol. 19, pp. 10502-10511, 1999.
J. C. Dessing, C. E. Peper, D. Bullock, and P. J. Beek, "How Position, Velocity, and Temporal Information Combine in Prospective Control of Catching: Data and Model," Journal of Cognitive Neuroscience, vol. 17, No. 4, pp. 1-19, 2005.
D. Bullock, J. C. Fiala and S. Grossberg, "A neural model of timed response learning in the cerebellum," Neural Networks, vol. 7, pp. 1104-1114, 1994.
S. Grossberg, S. and J. W. L. Merrill, "A neural network model of adaptively timed reinforcement learning and hippocampal dynamics," Cognitive Brain Research, vol. 1, pp. 3-38, 1992.
S. Grossberg, "On the dynamics of operant conditioning," Journal of Theoretical Biology, vol. 33, pp. 225-255, 1971.
S. Grossberg, "A neural theory of punishment and avoidance II: Quantitative theory," Mathematical Biosciences, vol. 15, pp. 253-285, 1972.
S. Grossberg, "A neural model of attention, reinforcement, and discrimination learning," International Review of Neurobiology, vol. 18, pp. 263-327, 1975.
S. Grossberg, "Processing of expected and unexpected events during conditioning and attention: A psychophysiological theory," Psychological Review, vol. 89, pp. 529-572, 1982.
L. J. Kamin, "Predictability, surprise, attention, and conditioning," in Punishment and Aversive Behavior, pp. 279-298, 1969.
S. Grossberg, and N. A. Schmajuk, "Neural dynamics of Pavlovian conditioning: Conditioned reinforcement, inhibition, and opponent processing," Psychobiology, vol. 15, pp. 195-240, 1987.
S. Grossberg, and N. A. Schmajuk, "Neural dynamics of adaptive timing and temporal discrimination during associative learning," Neural Networks, vol. 2, pp. 79-102, 1989.
S. Grossberg, "The link between brain learning, attention and consciousness," Consciousness and Cognition, vol. 8, pp. 1-44, 1999.
S. T. Grafton, A. H. Fagg, R. P. Woods, and M. A. Arbib, "Functional anatomy of pointing and grasping in humans," Cerebral Cortex, vol. 6, pp. 226-237, 1996.
S. T. Grafton M. A. Arbib, L. Fadiga, and G. Rizzolatti, "Localization of grasp representations in humans by PET: 2. Observation compared with imagination," Exploratory Brain Research, vol. 112, pp. 103-111, 1996.
M. Arbib and G. Rizzolatti, "Neural expectations: a possible evolutionary path from manual skills to language," Communication and Cognition, vol. 29, pp. 393-424, 1997. [Reprinted in Ph. Van Loocke (ed.) The nature, representation and evolution of concepts, London/New York: Routledge].
G. Rizzolatti, and M. A. Arbib, "Language within our grasp," Trends in Neuroscience, vol. 21, No. 5, pp. 188-194, 1998.
M. A. Arbib and M. Bota, "Language evolution: Neural homologies and neuroinformatics," Neural Networks, vol. 16, No. 9, pp. 1237-1260, 2003.
M. A. Arbib, "The Mirror System Hypothesis: How did protolanguage evolve?," In Maggie Tallerman, editor, Language Origins: Perspectives on Evolution. Oxford University Press, 2005.
R. S. Belvin, Inside Events: The non-possessive meanings of possession predicates and the semantic conceptualization of events. Ph.D. dissertation, USC, (available through UMI), 1996.
R. S. Belvin, "The two causative haves are the two possessive haves," Proceedings of the 29th Annual Conference of the Chicago Linguistics Society, University of Chicago, Chicago Linguistics Society, 1993.
R. S. Belvin, and M. D. den Dikken, "There, happens, to, be, have," Lingua, vol. 101, pp. 151-183, 1995.

(56) References Cited

OTHER PUBLICATIONS

S. Grossberg, "A psychophysiological theory of reinforcement, drive, motivation, and attention," Journal of Theoretical Neurobiology, vol. 1, pp. 289-369, 1982.

S. Grossberg and D. S. Levine, "Neural Dynamics of Attentionally Modulated Pavlovian Conditioning: Blocking, Inter-Stimulus, Interval and Secondary Reinforcement," Applied Optics, vol. 26, pp. 5015-5030, 1987.

J. L. Contreras-Vidal, J.L., S. Grossberg, and D. Bullock, "A neural model of cerebellar learning for arm movement control: Cortico-spino-cerebellar dynamics," Learning & Memory, vol. 3, pp. 475-502, 1997.

N. Srinivasa and R. Sharma, "SOIM: A self-organizing invertible map with applications in active vision," IEEE Trans. on Neural Networks, vol. 7, No. 3, pp. 758-773, May 1997.

S. Grossberg, "A psychophysiological theory of reinforcement, drive, motivation, and attention," Journal of Theoretical Neurobiology, vol. 1, 289-369, 1982.

Laird, J. E, Newell, A., & Rosenbloom, P. S. (1987). SOAR: An architecture for general intelligence. Artificial Intelligence, 33, 1-64.

A. Lansner, "Detailed Simulation of Large Scale Neural Networks", Computational Neuroscience: Trends in Research 1997, J. M. Bower. Boston, MA, Plenum Press: 931-935, 1997.

O. Sporns, R. Kötter, "Motifs in Brain Networks" PLoS Biology 2, 1910-1918, 2004.

G. A. Carpenter and S. Grossberg, Pattern recognition by self-organizing neural networks, Cambridge, MA, MIT Press, 1991.

S. Grossberg, The Adaptive Brain, vol. II, Elsevier, North Holland, 1987.

M. Mishkin, "Memory in monkeys severely impaired by combined but not separate removal of the amygdala and hippocampus," Nature, vol. 273, pp. 297-298, 1978.

Ryle, G., The concept of mind, Hutchinson Press, 1949, pp. 1-3.

L. P. Pavlov, Conditioned Reflexes, Oxford University Press, 1927.

J. E.R. Staddon, Adaptive Behavior and Learning, Cambridge University Press, 1983.

M. A. Arbib, P. Érdi, and J. Szentagothai, Neural Organization: Structure, Function, and Dynamics, Cambridge, MA, MIT Press, 1998.

The Handbook of Brain Theory and Neural Networks (MIT Press, 1995, 2003), Editor M. Arbib, pp. 1-3.

R. Hecht-Nielsen, A theory of Thalamocortex. Computational Models for Neuroscience—Human Cortical Information Processing. R. Hecht-Nielsen and T. McKenna, Springer, 2003.

Office Action 1 for U.S. Appl. No. 11/801,377, Date mailed: Apr. 28, 2010.

N. Ahmad, "The Humanoid robot cog," Crossroads, vol. 10.2, Cognitive Science, Winter 2003.

H. Choset, et al., "Topological simultaneous localization and mapping (SLAM): Toward exact localization without explicit localization," IEEE Transactions on Robotics and Automation, vol. 17, No. 2, Apr. 2001, pp. 125-137.

S. Eickeler, et al., "Hidden Markov model based continuous online gesture recognition," Int. Conference on Pattern Recognition (ICPR), pp. 1203-1208, Brisbane, Aug. 1998.

B.H. Juang, et al., "Hidden Markov model for speech recognition," Technometrics, vol. 33, No. 3, Aug. 1991, pp. 251-272.

P. Perner, "Why case-based reasoning is attractive for image interpretation," ICCBF 2080, pp. 27-43, 2001.

Thad Starner, et al., "Real-Time American sign language recognition from video using hidden Markov models." IEEE 1995.

A. Stentz, "Optimal and Efficient Path planning for partially-known environments," Proceedings IEEE International Conference on Robotics and Automation, May 1994, pp. 1-8.

J.R. Anderson, Rules of the Mind. Hillsdale, NJ: Lawrence Erlbaum Associates, 1993.

* cited by examiner

```
module HT { // Hypothalamus
    ...
    output SaccadeSuppression {
        datatype float;
    };
    ...
};
module SC { //Spinal Circuits
    ...
    output DeliberateSaccades {
        datatype
        float[NUM_EYE_MUSCLES];
    };
    ...
};
module SCL { //Superior Colliculus
    algorithm "SimpleSCL";
    input SaccadesSuppression
    {abort};
    input DeliberateSaccades
    {primary};
    output SaccadeVoltages {
        datatype
        float[NUM_EYE_MUSCLES];
    };
    ...
};
```

SYSTEM, METHOD, AND COMPUTER PROGRAM PRODUCT FOR GENERATING A SINGLE SOFTWARE CODE BASED ON A DESCRIPTION OF A DISTRIBUTED ARCHITECTURE

PRIORITY CLAIM

The present application is a Continuation-in-Part patent application of U.S. application Ser. No. 11/801,377, filed on May 9, 2007, entitled, "Cognitive Architecture for Learning, Action, and Perception." The present application is also a Continuation-in-Part patent application of U.S. patent application Ser. No. 11/973,161, filed Oct. 4, 2007, entitled, "Visual Attention and Object Recognition System," which is a non-provisional patent application claiming the benefit of priority of U.S. Provisional Application No. 60/849,975, filed on Oct. 6, 2006, entitled, "A Bio-Inspired Vision System for Object Recognition," and of U.S. Provisional Application No. 60/903,241, filed on Feb. 23, 2007, entitled, "A Bio-Inspired Vision System for Object Recognition."

FIELD OF INVENTION

The present invention relates to an artificial intelligence system and, more particularly, to a computational systems modeling and architecture development framework that implements an artificial intelligence system for generating a single software code based on a description of a distributed architecture.

BACKGROUND OF INVENTION

Artificial Intelligence (AI) is a branch of computer science that deals with intelligent behavior, learning, and adaptation in machines. Research in AI is traditionally concerned with producing machines to automate tasks requiring intelligent behavior. While many researchers have attempted to create AI systems, there is very limited prior work on comprehensive cognitive architectures.

For example, there is no comprehensive brain-like architecture that links physiology with anatomy and the derived functionalities. However, numerous neuroscience-inspired modal architectures have been proposed, such as those cited as literature reference numbers 1, 2, 3, 4, 5, 6, 7, 8, 9, 10, and 11 (See the "List of Cited References" below). Functional characterizations of these architectures typically use aspects from very different levels of biologically-inspired descriptions. For example, connectionists often base their architectural proposal on some abstract properties assumed to be involved in the information processing of the brain. Others are more biological in terms of their underlying modeling; however, they do not explain the wide body of experimental data.

A description of psychology-based architectures is provided since these represent the state of the art in cognitive architectures. While several cognitive architectures have been proposed and implemented, two popular and commonly used architectures are ACT-R (see literature reference no. 12) and Soar (see literature reference no. 13). ACT-R is a parallel-matching, serial-firing production system with a psychologically motivated conflict resolution strategy. Soar is a parallel-matching, parallel-firing rule-based system where the rules represent both procedural and declarative knowledge. However, several limitations of these traditional cognitive architectures exist (see literature reference no. 18).

Implementing such a complex system of neural-like components is a major challenge and, as such, there is very little existing work to draw on. Hecht-Nielsen and Lansner (see literature reference nos. 14 and 15) have built large systems, though not as all-encompassing in size and complexity as the present invention. Additionally, Spoms' (see literature reference no. 16) work on motifs in brain networks is a mathematical optimization technique to obtain network topologies that resemble brain networks across a spectrum of structural measures. Further, Andersen (see literature reference no. 17) has suggested building brain-like computers via software development using models at a level between low-level network of attractor networks and associatively linked networks. However, it is not clear how the above are neuromorphic architectures or that they support the large body of neuroscience data.

The computer program language that is a part of the present invention shares some features with the so-called "skeleton parallelism" programming languages, such as P3L and Ocam1P3L (see literature reference nos. 23, 24, and 25). However, such languages are general-purpose programming languages that are not in any way optimized for the programming of the brain-like systems, and they are not a part of a comprehensive suite of tools and technologies embodied in the present invention.

Research in neuroscience and cognitive psychology over the last several decades has made remarkable progress in unraveling the mysteries of the human mind. However, the prior art is still quite far from building and integrating computational models of the entire gamut of human-like cognitive capabilities. As discussed above, very limited prior art exists in building an integrated and comprehensive architecture.

A challenge present in the art is to develop a cognitive architecture that is comprehensive and covers the full range of human cognition. Current approaches are not able to provide such a comprehensive architecture. Architectures developed to-date typically solve single and multiple modal problems that are highly specialized in function and design. In addition, there are often very different underlying theories and architectures for the same cognitive modal problem. This presents a significant challenge in seamlessly integrating these disparate theories into a comprehensive architecture such that all cognitive functionalities can be addressed. Computational design and implementation of these architectures is another major challenge. These architectures must be amenable to implementation as stand-alone or hybrid neuro-AI architectures via software/hardware and evaluation in follow-on phases.

Thus, a continuing need exists for a computational systems modeling and architecture development framework for rapid prototyping and implementing of biologically-inspired computing modules in a flexible, extensible, adaptable, scalable and modular manner.

SUMMARY OF INVENTION

The present invention relates to a computational systems modeling and architecture development framework that implements an artificial intelligence system for learning, action, and perception. More specifically, the present invention is related to a method, system, and computer program product for generating a single software code based on a description of a distributed architecture. The method includes an act of receiving a description of an architecture having a set of functional modules with data flows specified between the functional modules (the data flows having data flow specifications). One or more processors are used to generate a BrainML file describing the architecture and generate code for each functional module. The term "BrainML file" refers to a computer-readable data file containing one or more BrainML descriptions and possibly containing other related content. The code includes initialization code and module wrapper code. The initialization code is code selected from a group consisting of code for starting the functional module, code for communicating with other functional modules, and code for controlling the functional module. The module wrapper code is then subsequently filled with implementation code. A build specification is generated that is needed by build tools to compile and link all functional modules into a single software code. A communication style is described for data flow between the functional modules of the architecture. Communication code is also generated to support the communication style. The module wrapper code is filled with the implementation code to create a filled wrapper code. Finally, the single software code is generated using the filled wrapper code, the communication code, initialization code, and build specification.

In another aspect, the description is converted into a graphical layout of the architecture. The graphical layout uses Brain Markup Language (BrainML) to specify information about the functional modules and the data flows between the functional modules.

Additionally, the system controls, executes, and debuggs the single software code.

In yet another aspect, code is generated for collecting and visualizing statistics as the single software code is running to facilitate debugging and performance evaluations.

In another aspect, in receiving a description of an architecture having a set of functional modules with data flows specified between the functional modules, the function modules include a primary input and auxiliary input channels and primary output and auxiliary output channels. Arrival of new data on a primary input channel causes the functional module to initiate a compute function and perform a round of computation on the new data. Alternatively, arrival of new data on an auxiliary channel is saved and utilized later when a new round of computation is triggered by an input arriving on a primary input channel.

In yet another aspect, a parser and syntax checker is implemented for grammar. Further, consistency criteria is formulated for determining if all the data flows for each of the functional modules are satisfied. A checker is implemented for the consistency criteria. A compiler module is implemented that takes the data flow specifications for a specific functional module and creates a "stub" header for an appropriate "compute" function.

Finally, as noted above, the present invention also comprises a computer program product and system. The computer program product comprises computer-readable instruction means stored on a computer-readable medium. The instruction means are executable by a computer having a processor for causing the processor to perform the described operations. In another aspect, the instruction means can be executable by a cluster or a network of multiple computers (i.e., multiple processors). The system comprises one or more processors that are configured to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 9 is an illustration of a fragment of an example programming language according to the present invention;

DETAILED DESCRIPTION

Figure 1:
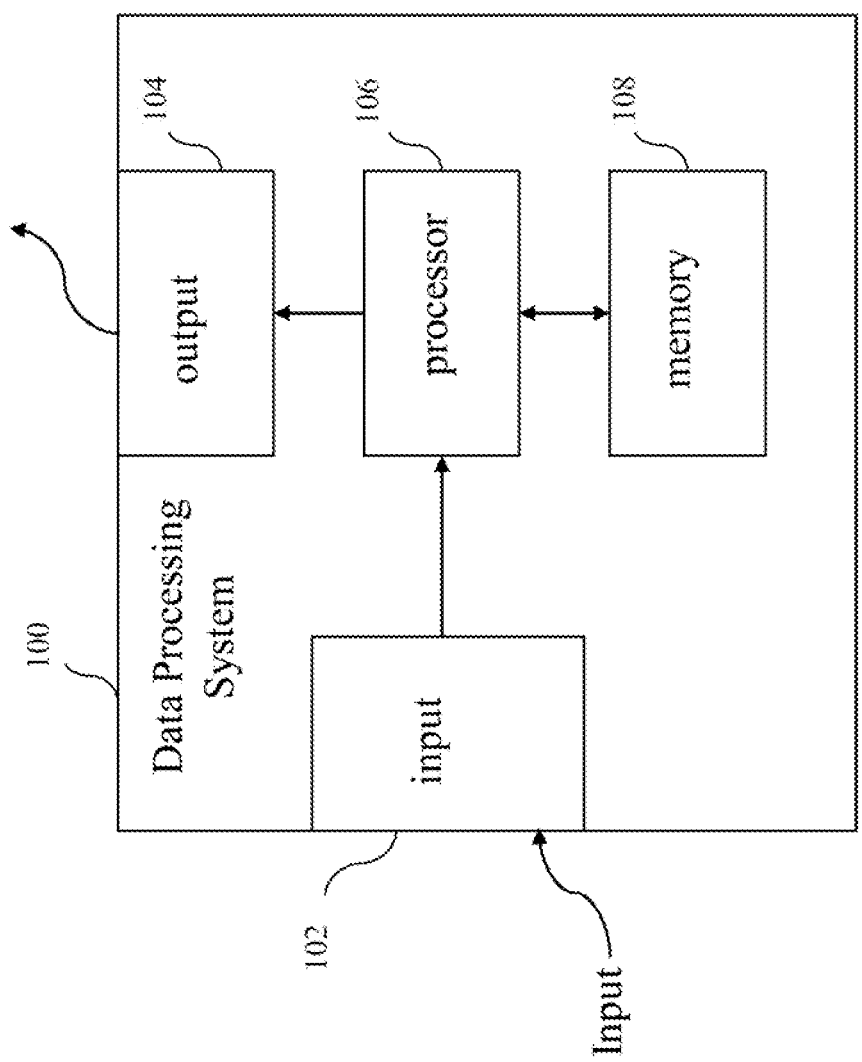
FIG. 1 is a block diagram depicting basic components of a system according to the present invention.

The present invention relates to an artificial intelligence system and, more particularly, to a computational systems modeling and architecture development framework which implements an artificial intelligence system for generating a single software code based on a description of a distributed architecture.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a glossary of terms and table of abbreviations that are used in the description and claims is presented. Following the glossary, a description of various principal aspects of the present invention is provided. Subsequently, an introduction provides the reader with a general understanding of the present invention. Next, details of the present invention are provided to give an understanding of the specific aspects. Finally, a summary is provided as a synopsis of the present invention.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. S. Grossberg, "The complementary brain: unifying brain dynamics and modularity," *Trends in Cognitive Sciences*, 4, 233-246, 2000.
2. R. D. S. Raizada and S. Grossberg, "Towards a theory of the laminar architecture of cerebral cortex: Computational clues from the visual system," *Cerebral Cortex*, 13, 100-113, 2003.
3. J. W. Brown, D. Bullock, and S. Grossberg, "How laminar frontal cortex and basal ganglia circuits interact to control planned and reactive saccades," *Neural Networks*, 17, 471-510, 2004.
4. S. Grossberg, "The link between brain learning, attention, and consciousness, *Consciousness and Cognition*, vol. 8, pp. 1-44, 1999.
5. G. A. Carpenter, S. Grossberg, "A massively parallel architecture for a self-organizing neural pattern recognition machine," *Computer Vision, Graphics and Image Processing*, vol. 37, pp. 54-115, 1987.
6. D. Bullock, S. Grossberg, and F. H. Guenther, "A self-organizing neural model of motor equivalent reaching and tool use by a multijoint arm," *Journal of Cognitive Neuroscience*, vol. 5, pp. 408-435, 1993.
7. V. Navalpakkam and L. Itti, "Modeling the Influence of task on attention," *Vision Research*, vol. 45, pp. 205-231, 2005.
8. S. Grossberg, S. and J. W. L. Merrill, "A neural network model of adaptively timed reinforcement learning and hippocampal dynamics," *Cognitive Brain Research*, vol. 1, pp. 3-38, 1992.
9. S. Grossberg and C. W. Myers, "The resonant dynamics of speech perception: Interword integration and duration-dependent backward effects," *Psychological Review*, (4), 735-767, 2000.
10. S. Grossberg, "A psychophysiological theory of reinforcement, drive, motivation, and attention," *Journal of Theoretical Neurobiology*, vol. 1, 289-369, 1982
11. M. Arbib and G. Rizzolatti, "Neural expectations: a possible evolutionary path from manual skills to language," *Communication and Cognition*, vol. 29, pp. 393-424, 1997. [Reprinted in Ph. Van Loocke (ed.) The nature, representation and evolution of concepts, London/New York: Routledge].
12. J. R. Anderson, *Rules of the Mind*. Hillsdale, N.J.: Lawrence Erlbaum Associates.
13. Laird, J. E., Newell, A., & Rosenbloom, P. S. (1987). SOAR: An architecture for general intelligence. *Artificial Intelligence*, 33, 1-64.
14. R. Hecht-Nielsen, A theory of Thalamocortex. Computational Models for Neuroscience—Human Cortical Information Processing. R. Hecht-Nielsen and T. McKenna, Springer, 2003.
15. Lansner, "Detailed Simulation of Large Scale Neural Networks", *Computational Neuroscience: Trends in Research* 1997, J. M. Bower. Boston, Mass., Plenum Press: 931-935, 1997.
16. O. Sporns, R. Kotter, "Motifs in Brain Networks" *PLoS Biology* 2, 1910-1918, 2004.
17. J. Anderson, "A Brain Like Computer for Cognitive Applications: The Ersatz Brain Project", International Conference on Cognitive Informatics 2005, Aug. 8, 2005, found at http://www.cog.brown.edu/Research/Ersatz-BrainGroup/presentations.html, taken on Sep. 4, 2008
18. S. Grossberg, "Bring ART into ACT" *Behavioral and Brain Sciences*, 26:5, 610, 2003.
19. Stuart I. Feldman, Make—a program for maintaining computer programs. *Software—Practice and Experience*, 9(4):255-265, 1979.
20. Jason J. Hickey, Aleksey Nogin, et al., The OMake home page, found at http://omake.metaprl.org/, taken on Sep. 4, 2008.
21. Jason Hickey and Aleksey Nogin. OMake: Designing a scalable build process. In *Fundamental Approaches to Software Engineering (FASE06)*, 2006.
22. Richard M. Stallman, Roland McGrath, and Paul Smith, GNU Make: A Program for Directing Recompilation. Free Software Foundation, July 2002, found at http://www.gnu.org/software/make/manual/index.html, taken on Sep. 4, 2008.
23. B. Bacci, M. Danelutto, S. Orlando, S. Pelagatti, and M. Vanneschi, $P^3L$: A structured high level programming language and its structured support. *Concurrency: Practice and Experience*, 7(3):225-255, May 1995.
24. Murray Cole. *Algorithmic skeletons: structured management of parallel computation*. MIT Press, Cambridge, Mass., USA, 1991.
25. Marco Danelutto, Roberto DiCosmo, Xavier Leroy, and Susanna Pelagatti. Parallel functional programming with skeletons: the OCam1P3L experiment. In *Proceedings ACM workshop on ML and its applications*. Cornell University, 1998.
26. S. Lazebnik, C. Schmid, and J. Ponce, "Beyond Bags of Features: Spatial Pyramid Matching for Recognizing Natural Scene Categories," in *Proceedings of the Institute of Electrical and Electronics Engineers (IEEE) Conference on Computer Vision and Pattern Recognition (CVPR)*, 2006.
27. H. Zhang, A. Berg, M. Maire, and J. Malik, "SVM-KNN: Discriminative Nearest Neighbor Classification for Visual Category Recognition," in *Proc. IEEE CVPR*, 2006.
28. G. Bradski, G. A. Carpenter, and S. Grossberg, "STORE working memory networks for storage and recall of arbitrary temporal sequences," *Biological Cybernetics*, vol. 71, pp. 469-480, 1994.
29. N. Srinivasa and N. Ahuja, "A Topological and Temporal Correlator Network for Spatio-Temporal Pattern Recognition and Recall," *IEEE Transactions on Neural Networks*, vol. 10, no. 2, pp. 356-371, March 1999.

30. S. Grossberg and J. W. L. Merrill, "The Hippocampus and cerebellum in adaptively timed learning, recognition and movement," *Journal of Cognitive Neuroscience*, vol. 8, pp. 257-277, 1996.
31. G. A. Carpenter, S. Grossberg, "A massively parallel architecture for a self-organizing neural pattern recognition machine," *Computer Vision, Graphics and Image Processing*, vol. 37, pp. 54-115, 1987.
32. G. A. Carpenter, S. Grossberg, "ART2: Stable self-organization of pattern recognition codes for analog input patterns," *Applied Optics*, vol. 26, pp. 4919-4930, 1987.
33. G. A. Carpenter and S. Grossberg, "ART3: Hierarchical search using chemical transmitters in self-organizing pattern recognition architectures," *Neural Networks*, vol. 3, pp. 129-152, 1990.
34. G. A. Carpenter, S. Grossberg, and G. W. Lesher, "The What-and-Where Filter," *Computer Vision ad Image Understanding*, vol. 69, no. 1, pp. 1-22, 1998.
35. S. Grossberg, "The link between brain learning, attention, and consciousness, *Consciousness and Cognition*, vol. 8, pp. 1-44, 1999.
36. G. A. Carpenter, S. Grossberg, J. H. Reynolds, "ARTMAP: Supervised real-time learning and classification of nonstationary data by self-organizing neural network," *Neural Networks*, vol. 4, pp. 1330-1336, 1995.
37. G. A. Carpenter and W. D. Ross, "ART-EMAP:A neural network architecture for object recognition by evidence accumulation," *IEEE Transactions on Neural Networks*, vol. 6, pp. 805-818, 1995.
38. S. Grossberg, K. K. Govindarajan, L. L. Wyse, and M. A. Cohen, "ARTSTREAM: a neural network model of auditory scene analysis and source segregation," *Neural Networks,* 17(4), 511-536, 2004.
39. S. Grossberg, I. Boardman, and M. Cohen, "Neural dynamics of variable-rate speech categorization," *Journal of Experimental Psychology,* 23:418-503, 1997.
40. Y. R. Asfour, G. A. Carpenter, S. Grossberg, and G. Lesher, "Fusion ARTMAP: A neural network architecture for multi-channel data fusion and classification," *Proceedings of the world congress on neural networks*, vol. II, pp. 210-215, Hillsdale, N.J.: Erlbaum Associates, 1993.
41. F. H. Guenther, "A neural network model of speech acquisition and motor equivalent speech production," *Biological Cybernetics,* 72, 43-53, 1994.
42. S. Grossberg, S., "Resonant neural dynamics of speech perception," *Journal of Phonetics*, vol. 31, pp. 423-445, 2003.

(2.1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Adaptive Resonance Theory—The term "Adaptive Resonance Theory" (ART) is used for stable construction of declarative and procedural memory within the sensory and cognitive processes based on "winner-take-all" and distributed computational mechanisms. Stable learning implies that the system can retain (not forget) large amounts of knowledge.

Adaptive Timing Circuits—The "adaptive timing circuits" refers to the interactions between the sensory and cognitive processes with spatial and motor processes via adaptive timing circuits to enable stable construction of action plans that lead to cognitive behaviors. The adaptively timed circuits can function at both micro and macro time scales, thereby providing the ability to enact a wide range of plans and actions for a continuously changing environment.

BLB—The term BLB refers to a Biologically-Inspired Cognitive Architecture (BICA) for integrated LEarning, Action and Perception (LEAP) Brain (B). The BLB is a single software code that is generated as the output of the present invention based on a description of a distributed architecture.

Brain Markup Language (BrainML)—The term "BrainML" refers to a specially designed programming language for describing the high-level structure of the BLB. BrainML is a declarative language for formulating the high-level structure of the BLB by describing the high-level functional modules and connections between them.

BrainML file—The term "BrainML file" refers to a computer-readable data file containing one or more BrainML descriptions and possibly containing other related content.

Complementary Computing—The term "complementary computing" refers to complementary pairs of parallel processing streams, wherein each stream's properties are related to those of a complementary stream (e.g., the "What" and "Where" streams). Complementary computing is needed to compute complete information to solve a given modal problem (e.g., vision, audition, sensory-motor control). Hierarchical and parallel interactions between the streams can resolve complementary deficiencies.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Laminar Computing—The term "laminar computing" refers to a unified laminar format for the neural circuits that is prevalent in the various regions of the cerebral cortex. It is organized into layered circuits (usually six main layers) that undergo characteristic bottom-up, top-down, and horizontal interactions. Its ubiquity means that the basic function of the cortex is independent of the nature of the data that it is processing. Specializations of interactions in different modalities realize different combinations of properties, which points to the possibility of developing Very Large-Scale Integration (VLSI) systems.

Linking Affordances and Actions—The term "linking affordances and actions" refers to extracting general brain operating principles (BOPs) from studies of visual control of eye movements and hand movements, and the linkage of imitation and language. It also refers to the integration of parietal "affordances" (perceptual representation of possibilities for action) and frontal "motor schemas" (coordinated control programs for action) and subsequent interactions.

Spatio-Temporal Pattern Learning—The term "spatio-temporal pattern learning" refers to working memory models such as STORE and TOTEM for stable construction of temporal chunks or events that will be used to construct plans and episodic memory. STORE refers to a Sustained Temporal Order Recurrent network, as described in literature reference no. 28 TOTEM refers to a Topological and Temporal Correlator network, as described in literature reference no. 29 Temporal chunking allows multimodal information fusion capability. This is used for storage of event information and construction of stable action plans.

Topographic Organization—The term "topographic organization" refers to organizations that are observed in both the sensory (e.g., retina, cochlea) and motor cortex, where world events that are neighbors (in some sense) are also represented in neighboring patches of the cortex. The topographic organization has strong implications for the details of connectivity within given brain areas, in particular, as it emphasizes local connectivity over long-range connectivity (2.2) Table of Acronyms The present invention uses several analogies to anatomical structures and pathways, many of which are abbreviated for brevity. The abbreviations and their corresponding definitions of the anatomical structures/pathways are as follows: THAL=Thalamus; SC=Somatosensory Cortex; AC=Auditory Cortex; VC=Visual Cortex; NC=Neocortex; MC=Motor Cortex; TC=Temporal Cortex; PC=Parietal Cortex; PFC=Prefrontal Cortex; HS=Hippocampal System; HT=Hypothalamus; CC=Cingulate Cortex; PLC=Prelimbic Cortex; AM=Amygdala; BG=Basal Ganglia; CBL=Cerebellum; and SCL=Superior Colliculus.

(3) Principal Aspects

The present invention has three "principal" aspects. The first is a learning system. The learning system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting basic components of the learning system of the present invention is provided in FIG. 1. The learning system 100 comprises an input 102 for receiving information from at least one sensor for use in detecting an object and/or event. Note that the input 102 may include multiple "ports." Typically, input is received from at least one sensor, non-limiting examples of which include video image sensors. An output 104 is connected with the processor for providing action information or other information regarding the presence and/or identity of object(s) in the scene to other systems in order that a network of computer systems may serve as a learning system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 can also be formed as clusters and/or networks of multiple computers, and multi-core and multi-CPU computers. The processor 106 is coupled with a memory 108 to permit storage of data and software that are to be manipulated by commands to the processor 106.

Figure 2:
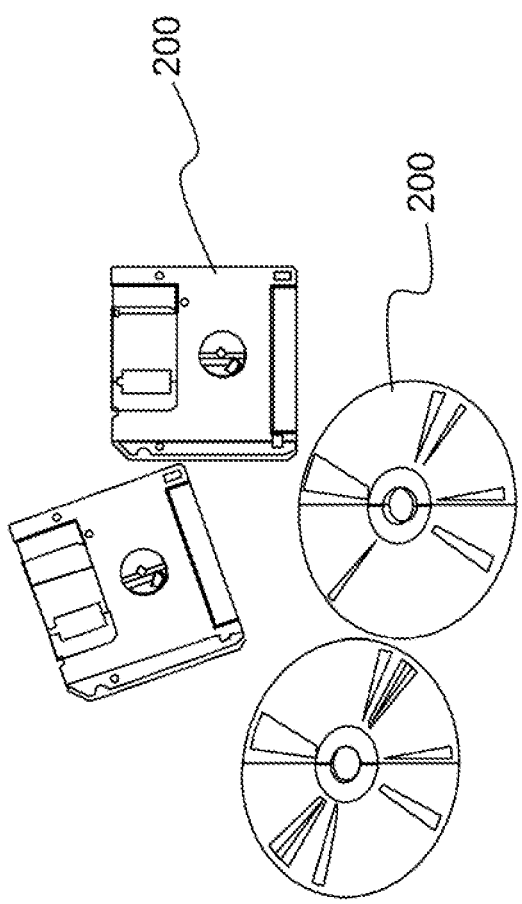
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

(4) Introduction

The present invention addresses the implementation and integration of computational models of human cognition based on neuroscience-inspired systems. A previous patent application, to which this application is a Continuation-in-Part application, described a Biologically-Inspired Cognitive Architecture for integrated LEarning, Action and Perception (BICA-LEAP). BICA-LEAP is a neuroscience-inspired learning system that seamlessly integrates perception, memory, planning, decision-making, action, self-learning and affect to address the full range of human cognition. The present invention introduces a BICA Systems Modeling and ARchiTecture development framework (or BICA-SMART). BICA-SMART is a modeling and architecture development system that implements BICA-LEAP in a flexible, parallel and scalable implementation. The output of BICA-SMART is an implementation (e.g., software) of BICA-LEAP that will be henceforth referred to as the BICA-LEAP Brain (BLB).

The present invention implements the BICA-LEAP in a flexible, adaptive and scalable way. In addition, it facilitates testing, development and validation of BICA-LEAP as well as allows transfer of parts (subsystems) of the architecture to other applications as stand-alone components such as scene understanding, navigation, etc. Although the BICA-LEAP is particularly suitable for the present invention, it should be noted that the present invention is not limited to implementing BICA-LEAP and can be applied to any distributed architecture to generate the BLB, or a single software code implementing the distributed architecture.

(5) Details of the Invention

As noted above, the present invention is a BICA-SMART. BICA-SMART is a modeling and architecture development system that implements BICA-LEAP in a flexible, parallel and scalable implementation. For clarity, BICA-LEAP will be described first to provide the foundational support for the present invention. Thereafter, BICA-SMART is described.

(5.1) Biologically-Inspired Cognitive Architecture for Integrated Learning, Action and Perception (BICA-LEAP).

BICA-LEAP is a neuroscience-inspired comprehensive architecture that seamlessly integrates perception, memory, planning, decision-making, action, self-learning and affect to address the full range of human cognition. BICA-LEAP was originally disclosed in U.S. application Ser. No. 11/801,377, which is incorporated by reference as though fully set forth herein. BICA-LEAP is based on the concept of brain operating principles and computational paradigms to realize structural, functional and temporal modularity and also integrate the various neural processes into a unified system that can exhibit a wide range of cognitive behaviors. A single comprehensive architecture that covers the full range of human cognition provides a basis for developing cognitive systems that can not only successfully function in a wide range of environments, but also thrive in new environments. BICA-LEAP and its adaptive, self-organizing, hierarchical architecture and integration methodology can lead to practical computational models that scale with problem size. Additionally, BICA-LEAP includes a framework to implement computational models of human cognition that could eventually be used to simulate human behavior and approach human cognitive performance in a wide range of situations. The BICA-LEAP can be integrated into a variety of applications and existing systems, providing support or replacement for human reasoning and decision-making, leading to revolutionary use in a variety of applications. Non-limiting examples of such applications include exploration systems, intelligence gathering/analysis, autonomous systems, cognitive robots, smart sensors, etc.

As briefly described above, an improvement over the prior art is that BICA-LEAP provides a single comprehensive architecture based on core Brain Operating Principles (BOPs) and Computational Paradigms (CPs) that realize structural, functional and temporal modularity. BICA-LEAP also integrates the various neural processes into a unified system that can exhibit wide range of cognitive behaviors to solve modal problems. The architecture is fully distributed in its structure and functional capabilities and lends itself to practical computational architectures. It is an inherently nonlinear and parallel architecture that offers a powerful alternative to the probabilistic and linear models of traditional AI-based systems.

The comprehensive architecture of the present invention addresses all of the issues described above in the background section. It also provides a representation of complex information in forms that make it easier to perform inference and organized self-learning that makes it applicable to various domains without extensive programming or reprogramming. It can therefore be the basis of future efforts to simulate and develop truly cognitive systems as well as interface to conventional AI systems for application in diverse domains (e.g., augmenting human performance across a range of intelligence domains).

Such a single comprehensive architecture that covers the full range of human cognition provides a basis for developing cognitive systems that not only successfully function in a wide range of environments, but also thrive in new environments.

This architecture is fully distributed in its structure and functional capabilities. One of its key BOPs is complementary processing which postulates several complementary and hierarchically interacting processing streams and sub regions that cooperate and compete in parallel. This interaction helps overcome informational uncertainty in order to solve problems in perception and learning. One key CP of the architecture is laminar computing which postulates a uniform layered format/structure for neural circuitry in various brain regions. This CP offers a unique and explicit formulation of the brain's approach to reusable computing with sharing of neural resources for perception and action. Yet another key theme of the present invention is that the brain has evolved to carry out autonomous adaptation in real-time to a rapidly changing and complex world. Use of Adaptive Resonance Theory (ART) as an underlying mechanism in the architecture of the present invention explains this autonomous adaptation. This architecture also integrates learning mechanisms, adaptively timed neural circuits, and reinforcement-learning based neural circuits that model emotional and motivational drives to explain various cognitive processes, including reasoning, planning, and action. The above key BOPs and CPs enable the present invention to control a flexible repertoire of cognitive behaviors that are most relevant to the task at hand. These characteristics are realized using an inherently nonlinear and parallel architecture and offers a powerful alternative to the probabilistic and linear models of traditional Artificial Intelligence (AI)-based systems.

Figure 3:
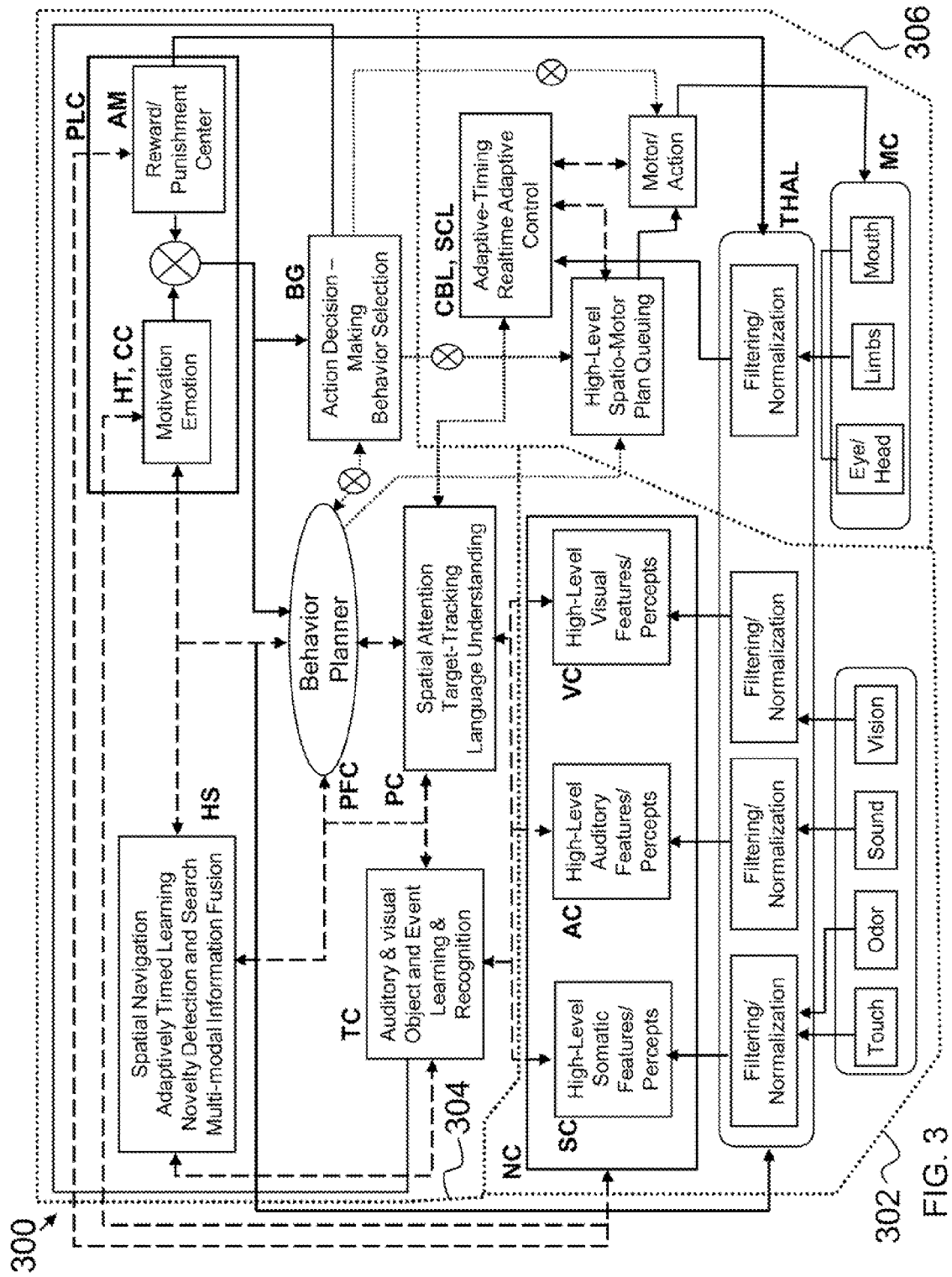
FIG. 3 is an illustration of a Biologically-Inspired Cognitive Architecture for integrated LEarning, Action and Perception (BICA-LEAP)

The architecture of BICA-LEAP is described as modules or systems that correspond to various cognitive and motor features. As shown in FIG. 3, the BICA-LEAP system 300 includes three basic modules, a sensory and perception module 302, a cognitive module 304, and an execution module 306. The large dashed arrows indicate a distributed set of links between any two structural entities to perform match learning (based on ART like circuits, described below) while the small dotted arrows indicate a distributed set of links between any two structural entities to perform mismatch learning (described below).

The modules are described by providing an account of functional roles at various stages as data is processed from the "bottom" to the "top" of the cortex. At the lowest level of the architecture is the sensory and perception module 302. The sensory and perception module 302 includes a set of peripheral sense organs including vision, auditory, and somatosensory sensors to sense the state of the external world. In other words, the sensory and perception module 302 is configured to receive and process external sensory input[s] from an external world and extract sensory-specific features from the external sensory input. The cognitive module 304 is configured to receive the sensory-specific features and identify a current context based on the sensory-specific features. Based on the current context and features, the cognitive module 304 learns, constructs, or recalls a set of action plans. The cognitive module 304 then evaluates the set of action plans against any previously known action plans in a related context. Based on the evaluation, the cognitive module 304 selects the most appropriate action plan given the current context. Finally, the execution module 306 is configured to carry out the action plan. The execution module 306 includes motor organs to perform actions based on the perception of the world, including occulomotor (eyes to saccade and fixate on targets), articulomotor (mouth to produce speech), and limbs (to move, reach for objects in space, grasp objects, etc.). For clarity, each of the basic modules and their corresponding sub-modules will be described in turn.

(5.1.1) Sensory and Perception Module

The sensory and perception module 302 generates and processes external sensory inputs from an external world and extracts sensory-specific features from the external sensory inputs.

(5.1.1.1) Preprocessing

Figure 4:
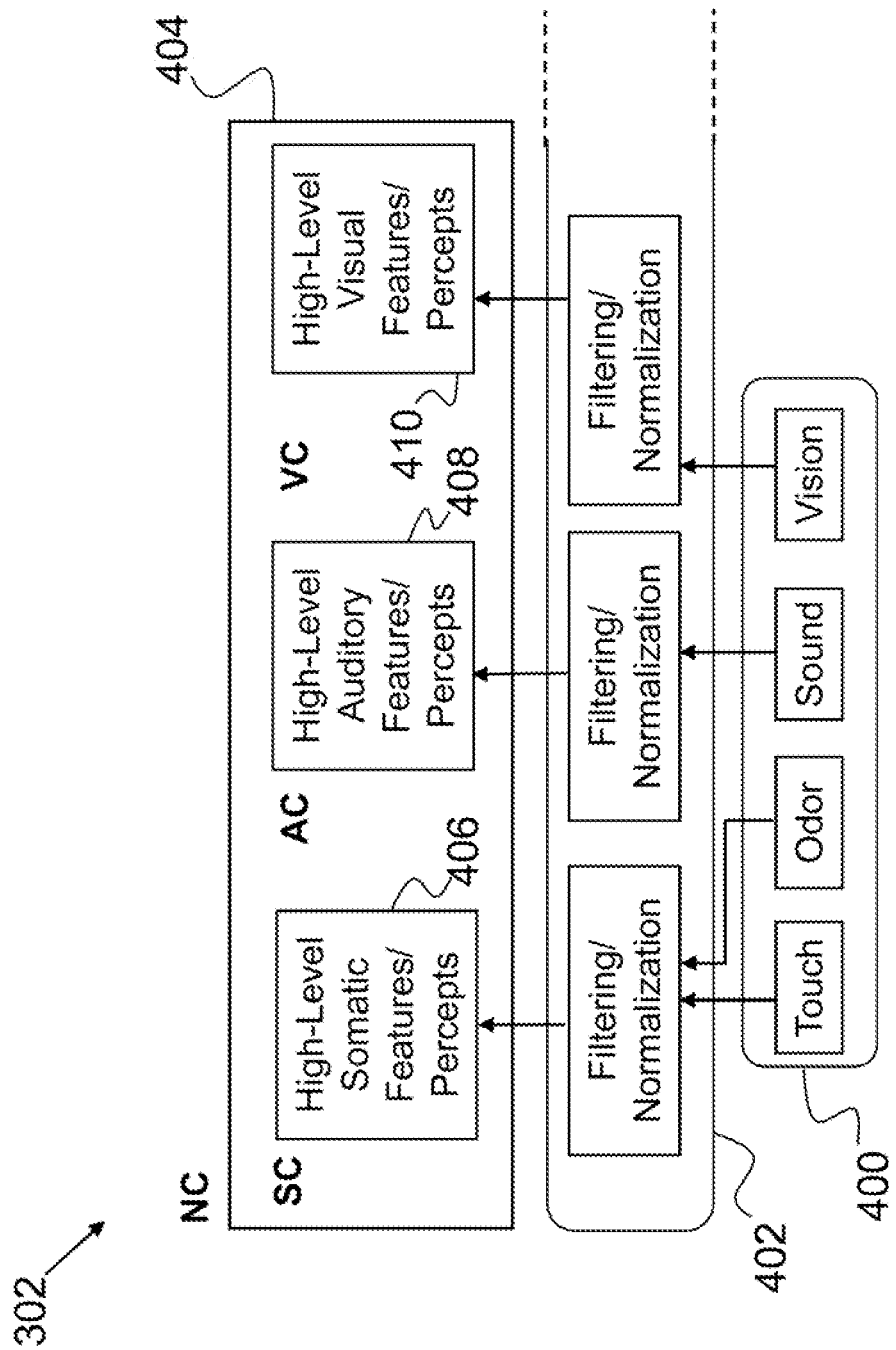
FIG. 4 is an illustration of the architecture of a sensory and perception module.

FIG. 4 is an illustration of the architecture for the sensory and perception module 302. As shown in FIG. 4, at the input level, the information input rate is limited by the spatial and temporal sampling rate of the sensors 400. Samples are best taken at high rates to gather maximum information. This generates a large amount of data, only a small fraction of which is relevant in any one situation. In order to extract useful information from this data, a pre-processing step is first initiated. During this step, the incoming data (external sensory inputs) for each modality (e.g., somatic sensor, auditory sensor, visual sensor) is filtered and normalized in a separate specialized circuit within a thalamus module 402 (THAL) (e.g., lateral geniculate nucleus (LGN) for vision (parvocellular and magnocellular divisions)). These functions are realized via cooperative-competitive interactions (on-center off-surround) within the thalamus module 402. This helps in preserving the relative sizes and, hence, relative importance of inputs and thereby helps overcome noise and saturation. Each modality is filtered and normalized using any suitable technique for filtering and normalizing external sensory inputs.

(5.1.1.2) Perception

The next step in processing is to abstract relevant information from the filtered and normalized input data. This abstraction process is initiated in a neocortex module 404 (NC) and propagates throughout cognitive module. The neocortex module 404 extracts sensory-specific features from the external sensory inputs (after they have been filtered and/or normalized by the thalamus module 402). The neocortex module 404 includes a somatic cortex (SC) module 406, an auditory cortex (AC) module 408, and a visual cortex (VC) module 410. The SC module 406 extracts somatic features from the scene, such as touch and odor. Additionally, the AC module 408 extracts auditory features, while the VC module 410 extracts visual features.

The neocortex module 404 is a modular structure that has the ability to integrate information from a remarkably diverse range of sources: bottom-up signals stemming from the peripheral sense organs; top-down feedback carrying goal related information from higher cortical areas (as explained later); and intrinsic horizontal signals carrying contextual information from neighboring regions within the same cortical area. These three distinct types of signals not only coexist within a single cortical area, but also interact and mutually shape each other's processing.

The present invention addresses these interactions based on laminar computing. Laminar computing concerns the fact that the cerebral cortex, the seat of all higher biological intelligence in all modalities, is organized into layered cortical circuits (usually six main layers) with characteristic bottom-up, top-down, and horizontal interactions. Specializations of these interactions in the different cortical areas realize different combinations of properties. Thus, the layered cortical circuit that "processes information" in the sensory cortex of a human when his/her hand is touched is the same circuit that "processes information" in the frontal cortex of a human when it thinks about a calculus problem. This incredible ubiquity means that the basic function of cortex is independent of the nature of the data that it is processing. The existence of such a unified laminar format for many different tasks also points to the possibility of developing very large-scale integration (VLSI) systems for intelligent understanding and control.

In the present invention, the notion of perception for different modalities is realized by integrating lower level features into a coherent percept within the neocortex module 404. This integration process is incorporated using the idea of complementary processing streams. In the present architecture, several processing stages combine to form a processing stream much like that in the brain. These stages accumulate evidence that realize a process of hierarchical resolution of informational uncertainty. Overcoming informational uncertainty utilizes both hierarchical interactions within the stream and the parallel interactions between streams that overcome their complementary deficiencies. For example, visual perception of form in the present architecture occurs via an ensemble of processing stages that interact within and between complementary processing streams. Boundary and surface formation illustrate two key principles of this capability. The processing of form by the boundary stream uses orientationally tuned cells to generate emergent object representations as supported by several psychophysical and neurophysiological experiments. Precise orientationally-tuned comparisons of left eye and right eye inputs are used to compute sharp estimates of the relative depth of an object from its observer, and thereby to form three-dimensional boundary and surface representations of objects separated from their backgrounds. Similarly, there exist such complementary properties in the form-motion interactions of the architecture for visual perception of moving objects. The orientationally-tuned form system that generates emergent representations of forms with precise depth estimates is complementary to the directionally-tuned motion system that can generate only coarse depth estimates on its own.

(5.1.2) Cognitive Module

As described above, the cognitive module receives the sensory-specific features, identifies a current context, and ultimately selects the most appropriate action plan given the current context. The cognitive module utilizes several sub-modules to select the most appropriate action plan.

(5.1.2.1) Learning and Attention: What, where, and how

Figure 5:
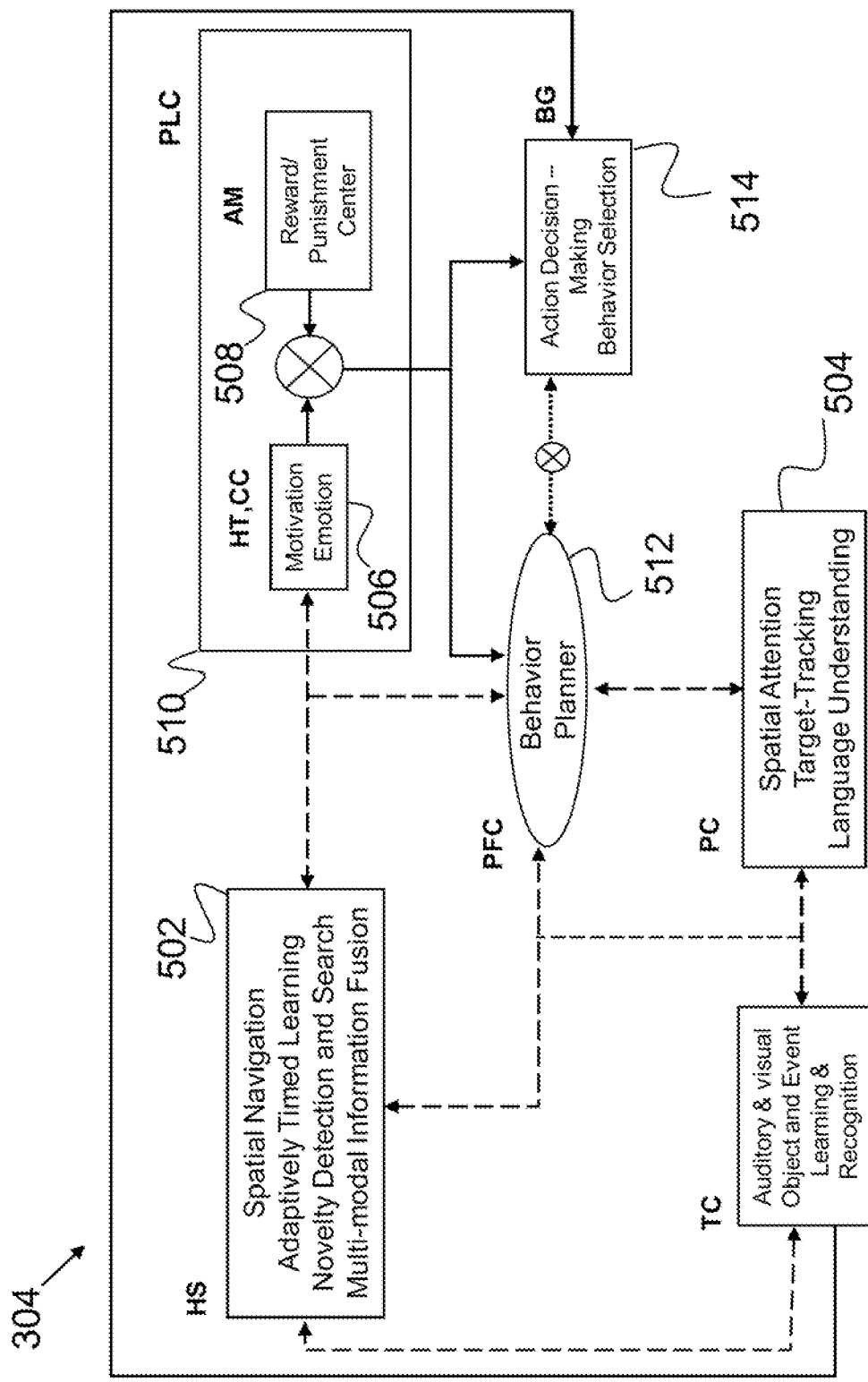
FIG. 5 is an illustration of the architecture of a cognitive module.

In the present invention, the complementary form and motion processing is part of a larger design for complementary processing whereby objects in the world are cognitively recognized, spatially localized, and acted upon. As shown in FIG. 5, the object and event learning system 500 learns to categorize and recognize what objects are in the world (i.e., declarative memory or memory with record). In other words, the object and event learning system 500 is configured to use the sensory-specific features to classify the features as objects and events. The object and event learning system 500 operates as a classification system.

Another module, the novelty detection, search, and navigation module 502 (described below) determines if the sensory-specific features match previously known events and objects by comparing the sensory-specific features against features corresponding to known objects and events. If there is no match, then the object and event learning system 500 stores the features as new objects and events. Alternatively, if there is a match, then the object and event learning system 500 stores the features as updated features corresponding to known objects and events. The object and event learning system 500 is analogous to the inferotemporal cortex (TC) and its cortical projections in a human's brain. As can be appreciated by one skilled in the art, the TC is the object and event learning system 500 and the TC is referred to herein interchangeably with the said system 500.

The object and event learning system 500 is to be contrasted with the spatial representation module 504, which learns to determine where the objects are and how to deal with them by locating them in space (i.e., procedural memory or memory without record), tracking them through time (i.e., when) and directing actions toward them. The spatial representation module 500 is configured to establish space and time attributes for the objects and events. The spatial representation module 500 uses any suitable device or technique for establishing space and time attributes given objects and/or events; a non-limiting example of such a technique includes using the technique as described by G. A. Carpenter, S. Grossberg, and G. W. Lesher in "The What-and-Where Filter," *Computer Vision and Image Understanding*, vol. 69, no. 1, pp. 1-22, 1998.

The spatial representation module 504 transmits the space and time attributes to the novelty detection, search, and navigation module 502. The novelty detection, search, and navigation module 502 is also configured to use the space and time attributes to construct a spatial map of the external world. The novelty, detection, search, and navigation module 502 constructs a spatial map using any suitable technique for converting space and time attributes into a spatial map, non-limiting examples of which include the techniques described by S. Grossberg and J. W. L. Merrill; G. A. Carpenter and S. Grossberg; G. A. Carpenter and S. Grossberg; and G. A. Carpenter and S. Grossberg, in literature reference nos. 30, 31, 32, and 33, respectively.

The detection, search, and navigation module 502 is analogous to the Hippocampal System (HS), and as can be appreciated by one skilled in the art, the HS is referred herein interchangeably with the said module 502. Additionally, the spatial representation module 504 is analogous to the parietal cortex (PC) and its cortical projections in a human's brain, and as can be appreciated by one skilled in the art, the PC is referred to herein interchangeably with the module 504.

The cortical projections (mentioned above) are realized using ART circuits within the architecture of the present invention (dashed lines between modules in FIGS. 3 through 6) (see literature reference nos. 32-37. These circuits are supported by neurophysiological data. Additionally, variants of ART have been used in several technological applications. ART circuits facilitate complementary interactions between the attentional subsystem (in the TC) and the spatial representation module 504 or the detection, search, and navigation module 502. The ART circuits enable the present invention to discover and stably learn new representations for novel objects in an efficient way, without assuming that representations already exist for as yet unseen objects.

In the present invention, auditory and speech percepts are emergent properties that arise from the resonant states of the ART circuits. For example, the present invention can use ARTSTREAM (see literature reference no. 38) to separate distinct voices (such as those in a cocktail party environment) into distinct auditory streams. Resonant dynamics between a spectral stream level at which frequencies of the sound spectrum are represented across a spatial map, and the pitch stream level that comprise a given pitch helps separate each auditory stream into a unique spatial map. Similarly, resonant waves between bottom-up working memory that represents the individual speech items and a top-down list categorization network that groups the individual speech items into learned language units or chunks is modeled in ARTPHONE (described in literature reference no. 39) to realize phonemic restoration properties.

Figure 6:
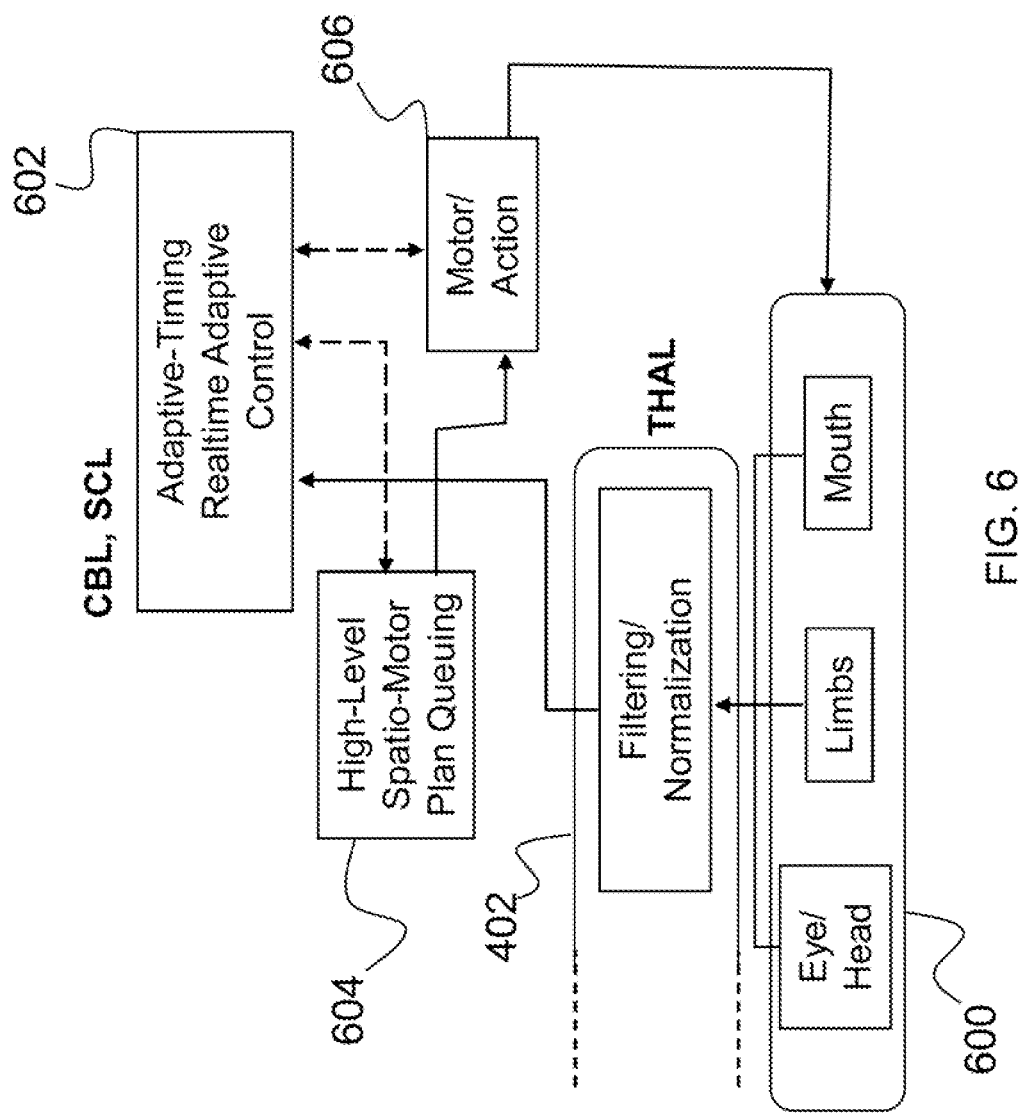
FIG. 6 is an illustration of the architecture of an execution module.

In addition to what and where streams, there is a how processing stream that operates in parallel and provides the capability to take actions based on the sensed world. First, as shown in FIG. 6, the signals from the muscles that control the motors 600 are filtered in the thalamus module 402. In order to effectively realize its actions (such as visually guided reaching of targets or grasping), the system uses the how stream to map the spatial representation of targets in the PC into a head-centered representation and eventually a body-centered representation. This representation is invariant under rotations of the head and eyes (e.g., sensors such as a camera). Intrastream complementarity occurs during this process wherein vergence of the two eyes/cameras, as they fixate on the object, is used to estimate the object's radial distance, while the spherical angles that the eyes make relative to the observer's head estimate the object's angular position. The head-centered representation of targets is used to form a spatial trajectory from the current position to the target position.

The inverse kinematics problem is solved when the spatial trajectory is transformed into a set of joint angle commands via information available during action-perception cycles. The inverse dynamics problem is solved by the invariant production of commanded joint angle time courses despite large changes in muscle tension.

Similarly, neural circuits exist in the architecture to model other modalities, such as the act of speaking that utilizes perceptual information from the auditory cortex during action perception cycles. These neural circuits with a unified format learn all these sensory-motor control tasks based on interactions between the PC, the motor cortex (MC) module (described below), the external valuation module (described below), and the cerebellum (CBL) module (described below). For these "basic" sensory-motor control tasks, the architecture of the present invention does not need to know what that target is. It relates to the target object as a set of possible affordances or opportunities for reaching and grasping it.

(5.1.2.2) Spatio-Temporal Learning

In higher cortical areas, as the signals move higher up in complexity space, time differences in neuronal firing induced by the input patterns become important. These higher areas model the relationships between high-level representations of categories in various modalities using temporal information (such as temporal order of objects/words/smells in the TC). The present architecture achieves this temporal learning capability using a combination of ART category learning, working memories, associative learning networks, and predictive feedback mechanisms to learn event categories.

As shown in FIG. 5, the prefrontal cortex (PFC) serves as a working memory where information converges from multiple sensory modalities which interacts with subcortical reward mechanisms (as in the amygdala (AM) module 506 and hypothalamus (HT) module 508 of the internal valuation module 510 (described below)) to sustain an attentional focus upon salient event categories. The PFC is analogous to the behavior planner module 512, and as can be appreciated by one skilled in the art, the PFC is referred to herein interchangeably with the said module 512. Essentially, the behavior planner module 506 is configured to receive information about the objects and events, the space and time attributes for the objects and events, and the spatial map. The behavior planner module 506 uses those inputs to learn, construct, or recall a set of action plans. Additionally, the behavior planner module 506 uses the status of the internal state (provided by the internal valuation module 510) to sub-select the most appropriate action from the set of action plans.

Multimodal information distributed across the PFC is integrated using ART (see literature reference no. 40) that is designed to selectively reset input channels with predictive errors and also selectively pay attention (ignore) to event categories that have high (low) salience due to prior reinforcement. The interactions between the TC and the PFC are a type of macro-timing process that integrates information across a series of events. The architecture of the present invention models the TC-HS interactions as a type of micro-timing process using an adaptive timing model that controls how cognitive-emotional and sensory-motor interactions are coordinated based on the interactions of the sensory representations (in TC), the drive representations (in the internal valuation module 510), and the motor representations (in the external valuation module 514 and the cerebellum (CBL) module). The motor representations also contribute to the modulation of declarative memory by motivational feedback and to the learning and performance of procedural memory.

The present invention is also capable of exhibiting complex task-driven visual behaviors for the understanding of scenes in the real world. Given a task definition, the architecture of the present invention first determines and stores the task-relevant/salient entities in working memory, using prior knowledge stored in the long-term memory of ART circuits. For a given scene, the model then attempts to detect the most relevant entity by biasing its visual attention with the entity's learned low-level features. It then attends to the most salient location in the scene and attempts to recognize the object (in the TC) using ART circuits that resonate with the features found in the salient location. The system updates its working memory with the task-relevance of the recognized entity and updates a topographic task relevance map (in the PC) with the location of the recognized entity. The stored objects and task-relevance maps are subsequently used by the PFC to construct predictions or plans for the future.

For more complex sensory-motor coordination tasks such as speaking and language understanding, the present invention capitalizes on the unified format of the above mentioned neural circuitry. The present invention integrates the PC and the coordinated control plans for action (or frontal motor schemas), including the PC's interaction with recognition (TC), planning (PFC) and behavioral control systems (external valuation module). This architecture is grounded in the use of mechanisms of vocal, facial and manual expressions that are rooted in the human's praxic interactions with the environment. The present invention incorporates spatial cues to aid audition/speech comprehension, temporal chunking, phonemic restoration and speech production models (see literature reference nos. 41 and 42).

(5.1.2.3) Emotion and Motivation

Because humans are physiological beings, humans have basic motivations that demand satisfaction (e.g., eating, drinking, sleeping, etc.). Each behavior can either satisfy or not satisfy one of these motivations. The present invention includes an internal valuation module 510 to mimic basic human motivations. The internal valuation module 510 is configured to evaluate the value of the sensory-specific features and the context. For example, the internal valuation module values the sensory-specific features and context such that they are modeled mathematically to have a value in a range between zero and one, where zero is the least valuable and one is the most valuable.

The internal valuation module is also configured to generate a status of internal states of the system and given the context, associate the sensory-specific features to the internal states as either improving or degrading the internal state. As a non-limiting example, the system is incorporated into a mobile robot. The robot determines that it is currently raining and that it is wet. Based on its knowledge of electrical systems, the robot determines that it would be best to seek cover to avoid the rain. Since the robot is currently traveling in a direction away from cover, the robot determines that to continue in its current trajectory will increase its wetness (or time being wet), and thereby degrade its internal state (increasing its wetness which is contrary to its desire to be dry).

In other words, when an ongoing behavior/perceptual state enters the prelimbic cortex (PLC) as an input, a correlated emotional response is generated. The PLC is analogous in function to the internal valuation module 510, and as can be appreciated by one skilled in the art, the PLC is referred to herein interchangeably with the said module 510.

The internal valuation module 510 includes two sub-modules, the AM module 508 and the HT module 506. The AM module 508 is a reward/punishment center that generates a reward or punishment for certain actions. The rewards or punishments are defined as valuations of the internal state of the system and whether or not certain actions degrade or improve the internal state. The HT module 506 learns to correlate these behavior patterns with feedback signals to the behavior planner module 512 and the novelty detection, search, and navigation module 502 that map the sensory representations using ART circuits. Emotions are produced in response to behaviors that impact currently active actions or motivational drives. Each cortical plan/prediction of behavior (from the behavior planner module 512) enters the internal valuation module 510 as spatio-temporal patterns that produce as output the emotional reaction to each plan. The output of the behavior planner module 512 describes what is going to happen, while the output of the internal valuation module 510 describes what should happen. Mismatches between the behavior planner module 512 and the internal valuation module 510 are used by the external valuation module 514 to compute expected utility of the currently active action plan. If the mismatch is large, then the external valuation module 514 will inhibit (attentional blocking of) the current behavior (action plan) and a new one is selected.

In other words, the external valuation module 514 is configured to establish an action value based purely on the objects and events. The action value is positively correlated with action plans that are rewarding to the system based on any previously known action plans. The external valuation module 514 is further configured to learn from the positive correlation to assess the value of future action plans and scale a speed at which the action plans are executed by the execution module (element 306 in FIGS. 3 and 6). Finally, the external valuation module 514 is configured to open a gate in a manner proportional to the action value such that only action plans that exceed a predetermined action value level are allowed to proceed to the execution module 306.

In the architecture of the present invention, this inhibition is modeled as an on-center off-surround within the external valuation module 514. This will enable the architecture to model decision making for complex spatial and motor processes, such as planned eye/camera saccades and control of catching a target object. Once the decision to act is made by the external valuation module 514, the complex motor sequences for the selected or contextually appropriate behaviors/plan (available in the behavior planner module 512) are reinforced at the internal valuation module 510. As shown in FIG. 6, the selected motor plans are used by a timing control module 602 to execute a set of adaptively-timed actions (movements) until the goal is reached.

As can be appreciated by one skilled in the art, the present invention includes a system, method, and computer program product that is configured to perform the various cognitive functions using a corresponding module/pathway.

(5.1.3) Execution Module

As described above and shown in FIG. 6, the execution module 306 is configured to carry out the action plan. Actions are manifested in the form of motor plans (action plans), non-limiting examples of which include running, yelling, etc. The selected action plans are used by the CBL and SC to execute a set of adaptively timed actions (movements) until the goal is reached. Here the CBL serves as an organ for adaptive control real-time control circuits that can use the information about the evolving sensory-perceptual context, and about errors in realization of the desired goal to continually correct itself until the desired goal state is achieved.

More specifically, the execution module 306 includes a queuing module 604 to receive the action plans and order them in a queue sequentially according to their action value. Additionally, the timing control module 602 determines the speed at which to execute each action plan. A motor/action module 606 is included that integrates the order and speed at which to execute the action plans. The motor/action module 606 then sends a signal to the corresponding motor 600 to sequentially execute the action plans according to the order of the queue and the determined speed. Based on the sequential execution, the timing control module 602 learns the timing of the sequential execution for any given action plan in order to increase efficiency when executing similar action plans in the future.

(5.1.4) Consciousness

In the architecture of the present invention, all resonant states are conscious states. If a particular region (module) is strongly resonating with the bottom-up stimuli, the system is more conscious of those events. Any learned spatio-temporal pattern is determined partly by bottom-up data and partly by top-down selection. The degree to which the system is conscious of particular actions is determined by how much the representation was formed by top-down selection (in the TC, HS, and PFC) or degree of resonance, as opposed to being determined by bottom-up data. Thus, firing patterns in sensory and cognitive areas that are directly selected (by attention) have the most meaning in the architecture and it is most conscious of its activity at that time. When the models described above are combined into the comprehensive system architecture for intelligent behavior, the sensory and cognitive match-based networks in the What processing stream provide self-stabilizing representations with which to continually learn more about the world without undergoing catastrophic forgetting. The Where/How processing stream's spatial and motor mismatch-based maps and gains can continually forget their old parameters in order to instate the new parameters that are needed to control the system in its present form. Since the spatial and motor or procedural memory processes are often based on inhibitory matching, it does not support excitatory resonance and hence cannot support consciousness in the architecture. The complementary match and mismatch learning mechanisms within this larger architecture combined with the adaptive timing circuits that mediate their interactions illustrates how circuits in the self-stabilizing match-based sensory and cognitive parts of the brain can resonate into consciousness, even while they are helping to direct the contextually appropriate activation of spatial and motor circuits to perform cognitive actions. The mechanisms that unify these effects within the architecture are inherently nonlinear and parallel and offer a powerful alternative to the probabilistic and linear models currently in use.

(5.2) BICA Systems Modeling and ARchiTecture Development Framework (BICA-SMART)

Figure 7:
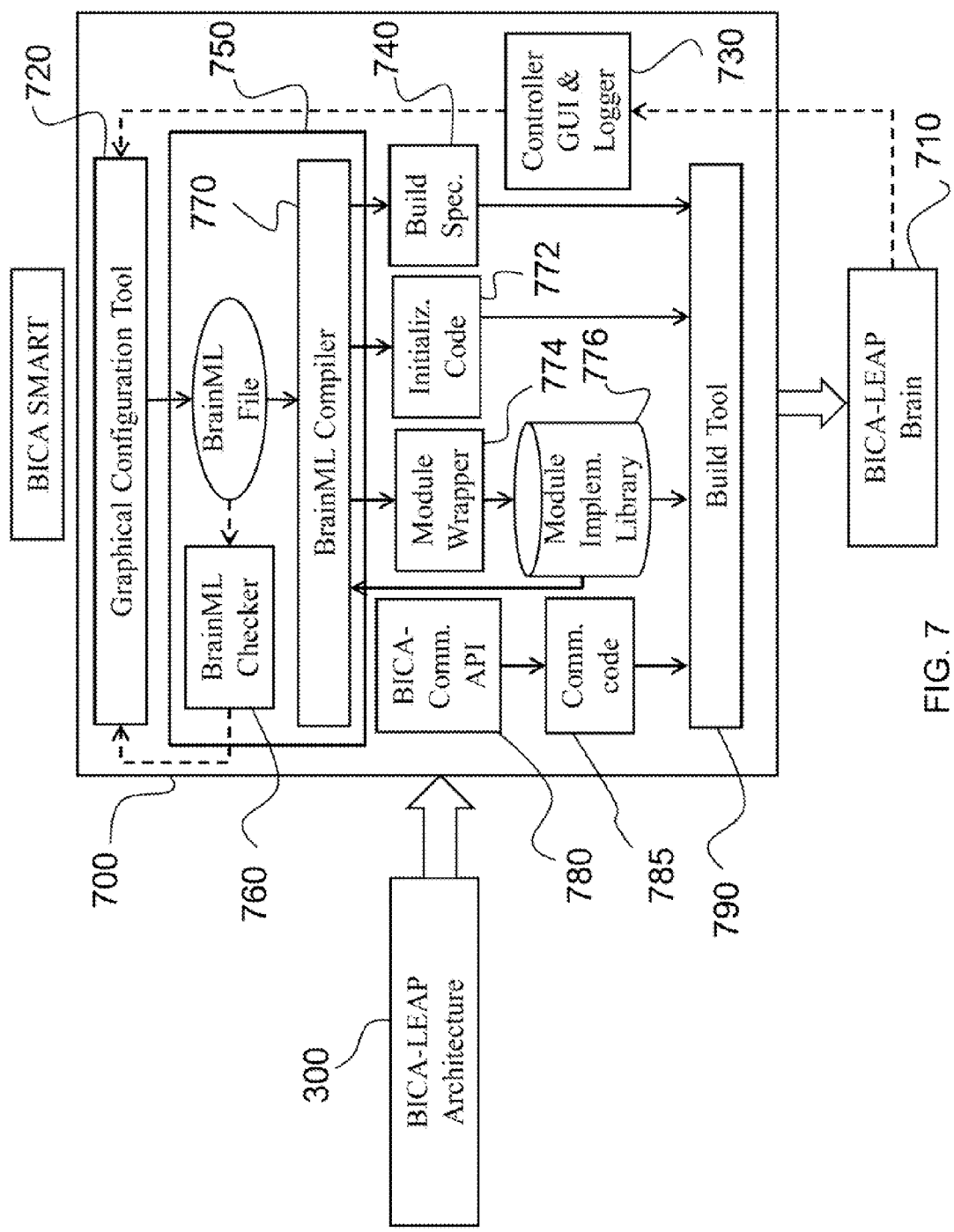
FIG. 7 is a flow chart depicting a functional diagram of a computational systems modeling and architecture development system according to the present invention.

BICA-SMART is a suite of systems embodied in software, programming interfaces, libraries and tools designed to facilitate software implementation of biologically inspired algorithms and architectures by providing support for rapid prototyping, modular development, debugging and visualization. As shown in FIG. 7, the BICA-SMART 700 is a computational architecture development framework that facilitates development of a software implementation of the BICA-LEAP 300 architecture. As stated earlier, the biologically inspired software implementation of BICA-LEAP 300 is the BICA-LEAP brain (BLB) 710. A specially designed language (i.e., brain markup language ("BrainML")) 750 is used to describe the high-level structure of BLB 710. Automated tools take such description and produce appropriate "glue" and "module stubs" code providing the requisite software infrastructure, allowing the module implementers to concentrate on the development of the appropriate biologically inspired algorithms. The module stubs are intended to be filled in with appropriate implementations, resulting in a library of biologically inspired functional modules. BrainML is the XML specification of the BLB. BrainML is a concept that becomes essential for making this approach scale to larger architectures and more complex data flows.

The low-level communications is abstracted by a specially designed programming interface 730 that would afford a variety of implementations (ranging from highly generic to highly optimized ones) that can be transparently swapped for one another without having to change the code for the functional modules. A build specification 740 is created automatically from the BrainML specification 750 and the complete BLB 710 binaries will be generated from the relevant components. The whole process of maintaining the BrainML 750 representation, building the BLB 710 from it, running and debugging the resulting BLB 710 will be controlled from a graphical configuration, visualization and control tool 720. Key innovations of the BICA-SMART 700 include:

1. Flexible and adaptive framework for architecture development and integration methodology that will allow merging existing and new models;
2. Spiral development—an environment where one can concentrate on implementing and improving a particular functional module, without having to worry about low-level implementations of the inter-module communication, control work, or how other unrelated functional modules will be implemented, etc;
3. Modularity—ability to replace individual functional modules with better/faster implementations without affecting overall architecture;
4. Flexibility that is needed in order to be able to meet the developing neuroscience, including new neuroscience theory, new functional modules, new biologically inspired algorithms, etc.;
5. Extensibility and scalability with respect to functional modules—Allows for the addition of one or more functional modules in the future. Also allows for the separation of a functional module, replacing it with a more refined implementation consisting of several smaller modules;
6. Scalability with respect to parallelization—allows starting with a simple (possibly serial/uniprocessor) implementation, while providing a clear growth and evolution path towards highly distributed implementations;
7. Ability to preserve the learned state of a BLB (i.e., an ability to save and load "brain dumps");
8. Ability to facilitate debugging and visualization tasks;
9. Ability to debug and train isolated parts of the BLB (consisting of several related functional modules) without having to run the whole BLB; and
10. Ability to extract a BLB fragment as a self-contained software component that can then be utilized in various applications.

(5.2.1) Data and Control Flows in BLB

Most key principles of the BICA-LEAP cognitive architecture directly translate into design principles of BLB. For example, following the biological inspiration, the high-level organization of BLB will be fully decentralized and asynchronous. BLB will consist of a number of functional modules, each corresponding to an area of the primate brain identified in the BICA-LEAP architecture. The modules will all be running in parallel and communicating via messages. As in the biological brain, where signals not only serve to propagate data, but also act as a control mechanism, the messages communicated between modules in the present invention will act as a decentralized control mechanism.

In other words, one of the core concepts of BICA-SMART is that the high-level control structure in BLB will be fully defined by the data flow. This data flow is organized into a set of "channels," each propagating a data of a specific kind from one set of modules to another. Most of the channels will have a single sender and a single receiver, but in some cases, several recipients will receive the information sent on a particular channel. The channels are implemented by the underlying communication infrastructure provided by the BICA-SMART ("BICA-Comm"), which is described in further detail below.

Figure 8:
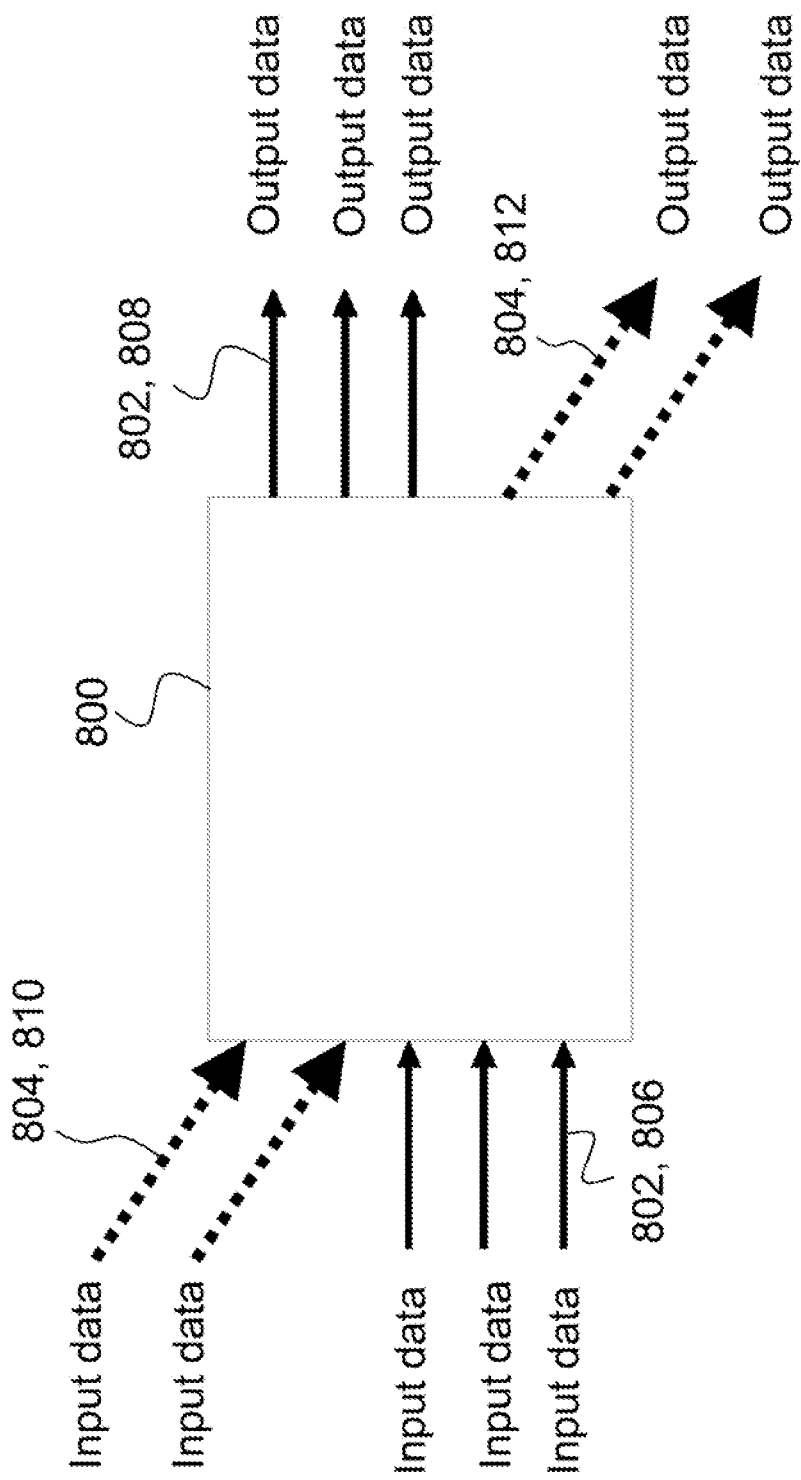
FIG. 8 is an illustration of data flow for a single functional module according to the present invention.

As shown in FIG. 8, the control structure for each functional BLB module 800 is defined by its input channels. FIG. 8 depicts an abstract BLB module 800, illustrating data flow for a single functional module. In general, the computation in each BLB module 800 will happen in asynchronous "rounds," where the BLB module 800 would consume the data received on some of its input channels and potentially produce a set of output data for some of its output channels.

In most cases, the arrival of data on an input channel would cause the receiving module to perform the new round of computation on the newly received data. For example, the arrival of a new feature vector to the object recognition module of the BLB (the "TC" module) module 800 would trigger the computation, where the new feature vector is classified and the corresponding object is recognized. For illustration purposes, such a channel will be referred to as a "primary" channel 802 (illustrated as a solid line).

In addition to primary channels 802, there are "auxiliary" channels 804 (illustrated as a dashed line). When new data arrives on an auxiliary channel 804, it does not immediately trigger any computation. Instead, the data is saved and then utilized later when a new round of computation is triggered by an input arriving on a primary channel 802. For example, when a top-down biasing data arrives at the object recognition module, it will be saved and then utilized later when a new feature vector triggers a new round of computation.

Each module will have a number of primary input 806 and primary output channels 808, and a number of auxiliary input 810 and auxiliary output 812 channels. Each module 800 will have at least one primary input channel 806 and at least one output channel (either a primary output 808 or an auxiliary output 812 channel). Note, however, that the primary/auxiliary classification is only important for the receiving module, while the sending module does not necessarily need to know how the data it outputs will be used. Modules that have more than one primary input channel 806 may perform different computations, depending on which channels have triggered it. Some may even have parallel threads reacting to different channels in parallel.

The primary input channels 806 of each BICA-LEAP module 800 are further classified depending on the module's behavior in cases when data is received while the module is already computing (for example, processing a data packet it had previously received). These would be examples of "control" information since it controls the behavior of the BICA-LEAP module 800.

In some cases, modules need to abort the current computation and restart with new data. One example is that the spinal circuits may need to abort the current motor control when data arrives from the hypothalamus ("freezing/startling reaction").

In other cases, modules may need to queue the new data for later processing. For example, if the pre-motor cortex receives a new step of the motor plan from the Dorsolateral Prefrontal Cortex (DLPFC) while it is still processing the previous step, this new step will need to be queued.

In yet other cases, some modules may need to suppress the output until all the inputs are exhausted. For example, when new emotional stimuli arrive at the amygdale from the thalamus, the amygdala will cease outputting its drive state until it has a chance to update it based on the new emotional stimuli.

Finally, some modules can simply discard inputs when busy. For example, sensory processing might discard some stimuli when overloaded.

(5.2.2) BICA-SMART Components

The following sections describe the main components of the BICA-SMART.

(5.2.2.1) Brain Markup Language (BrainML)

BICA-SMART includes a specially designed programming language for describing the high-level structure of the BLB; the BrainML (Brain Markup Language).

BrainML is a declarative language for formulating the high-level structure of the BLB by describing the high-level functional modules and connections between them. BrainML has facilities for specifying the basic information about the functional modules in BLB, including:

1. The algorithm for use with the functional module (either a name of an algorithm that is already implemented or a name of an algorithm that is being planned). The choices may include:
   a. Quick prototypes of experimental algorithms;
   b. Algorithms designed to follow the biology as close as possible (possibly to the level of modeling individual neurons);
   c. Algorithms that combine the biological inspiration with the engineering pragmatism to create efficient smart algorithms; and
   d. Multithreaded parallel algorithms (possibly optimized for specific hardware platforms).
2. The programming language that will be used to implement the functional modules, non-limiting example of suitable programming language includes C/C++, Matlab, and Java.
3. Optionally: the expected computational requirements of the process (the number of threads, the number of processors, etc.)

BrainML also has the facilities for specifying the data channels in the BLB, including:

1. The producer and receiver(s) of the data;
2. The data type of the flowing information (for example, a vector of floating-point numbers, or a raw red/green/blue (RGB) image);
3. The control significance of the data for the receiving module, as described above;
4. Optionally: how the data should be displayed to the user by the debugging and visualization tool.

FIG. 9 is an illustration of short sample fragment 900 of what a BrainML specification looks like. In this example, a simple C-like syntax was used and the channel specifications were split between the specifications of the sending and receiving modules.

To create a suitable BrainML language, a plurality of acts are performed. The acts for creating a suitable BrainML language include:

1. Designing the high-level structure of the language. This includes determining:
   a. How the BLB specifications will be structured (e.g., will the specifications emphasize channels or will they emphasize modules);
   b. How the language itself will be structured and represented (e.g., will it use XML or some custom syntax, what the scoping structure will be etc.); and
   c. Which high-level features will the BrainML language have (e.g., will it have some sort Of "macros"

capability, where a macro can be defined upfront and then be reused in the remainder of the specification).
2. Designing the language for specifying the data structures being sent across the channels. This language needs to be fairly generic and high-level in order to be sufficiently flexible and independent of the underlying programming language (i.e., the system can not simply use the C or Java data types); it also needs to be extensible, as new kinds of data types may be added later.
3. Refining the classification of the control significance of different channels and designing a language for expressing it.
4. Defining a grammar for representing the core BrainML structures and concepts developed in acts 1 through 3 above.
5. Extending the language with additional concepts as needed to support other BICA-SMART and BLB tasks.

(5.2.2.2) BrainML Compiler and Checker

Referring again to FIG. 7, the BrainML 750 specification of the BLB 710 would serve as a "central hub" for a suite of tools. The suite contains a BrainML checker 760 capable of detecting inconsistencies in BrainML specifications. The BrainML checker 760 is configured to check that all the dataflow (e.g., input/output) requirements for each of the functional modules (e.g., element 800 in FIG. 8) are satisfied. For example, the BrainML checker is configured to detect inconsistencies in the BrainML file to determine if all the data flow requirements for each of the functional modules are satisfied (and if an inconsistency is detected, alert a user of the inconsistency to enable the user to use the graphical configuration tool to correct the BrainML file). The BrainML checker repeats the processing until the BrainML file has no inconsistencies The suite also contains a BrainML compiler 770 capable of producing all the relevant "glue" code automatically. For each functional module, the module implementation library 776 contains a "compute" function to produce the "glue" code. In general, the module implementation library 776 is a module that a user can write and generate manually since it contains specific code to do the computations. Thus, some of the code is generated by the system, while other code can be input by a user. For example, a user can generate the implementation code to fill the module wrapper code and create a filled wrapper code. Thus, with the code generated, the module implementation library 776 will be expected to provide a "compute" function that would perform a single "round" of computation (or, possibly, several different "compute" functions for the modules that are supposed to perform different computations when triggered by different input channels). Namely, the compute function would take the data received on the input channels and produce the data to be sent on the output channels. The BrainML compiler 770 would then generate the rest of the code.

Various types of code generated by the BrainML compiler 770 include:
1. For each of the functional modules, the BrainML compiler 770 generates
   a. The code for starting the module;
   b. The code for communicating with other modules (using the appropriate communication protocol, as described below);
   c. Control code, including the code that would invoke the appropriate compute function after receiving a message on a primary input channel, supplying the compute function with the proper inputs and sending the outputs of the compute function to the appropriate recipients.
2. For each of the functional modules, for which an implementation is not yet available, the BrainML compiler 770 creates an appropriate "stub" code for the relevant compute function(s) that can then be filled in with the actual implementation.
3. The BrainML compiler 770 generates build specifications for an off-the-shelf build tool (such as GNU Make (see literature reference nos. 18 and 21) or OMake (see literature reference nos. 19 and 20) that would enable automated compilation and linking of a complete BLB out of all the relevant components. In the example illustrated in FIGS. 10 and 11, the build specification is a modular cross-platform build specification for the OMake build tool. This is the script written in OMake that is used to build (compile, link, etc.) the final software executable. It is the same as the Makerfile for the MAKE build tool (except the Makefile is not cross-platform; using OMake makes it a lot more robust and flexible).
4. Optionally, the BrainML compiler 770 produces the code for visualizing and debugging the data flows in the BLB.

In other words, the BrainML compiler 770 generates code for each functional module that includes initialization code 772 and a module wrapper code 774 that is subsequently filled with implementation code provided by the module implementation library 776. The initialization code includes code for starting the module; code for communicating with other modules (communication code or layer); and code for controlling the module function/operation.

Figure 10:
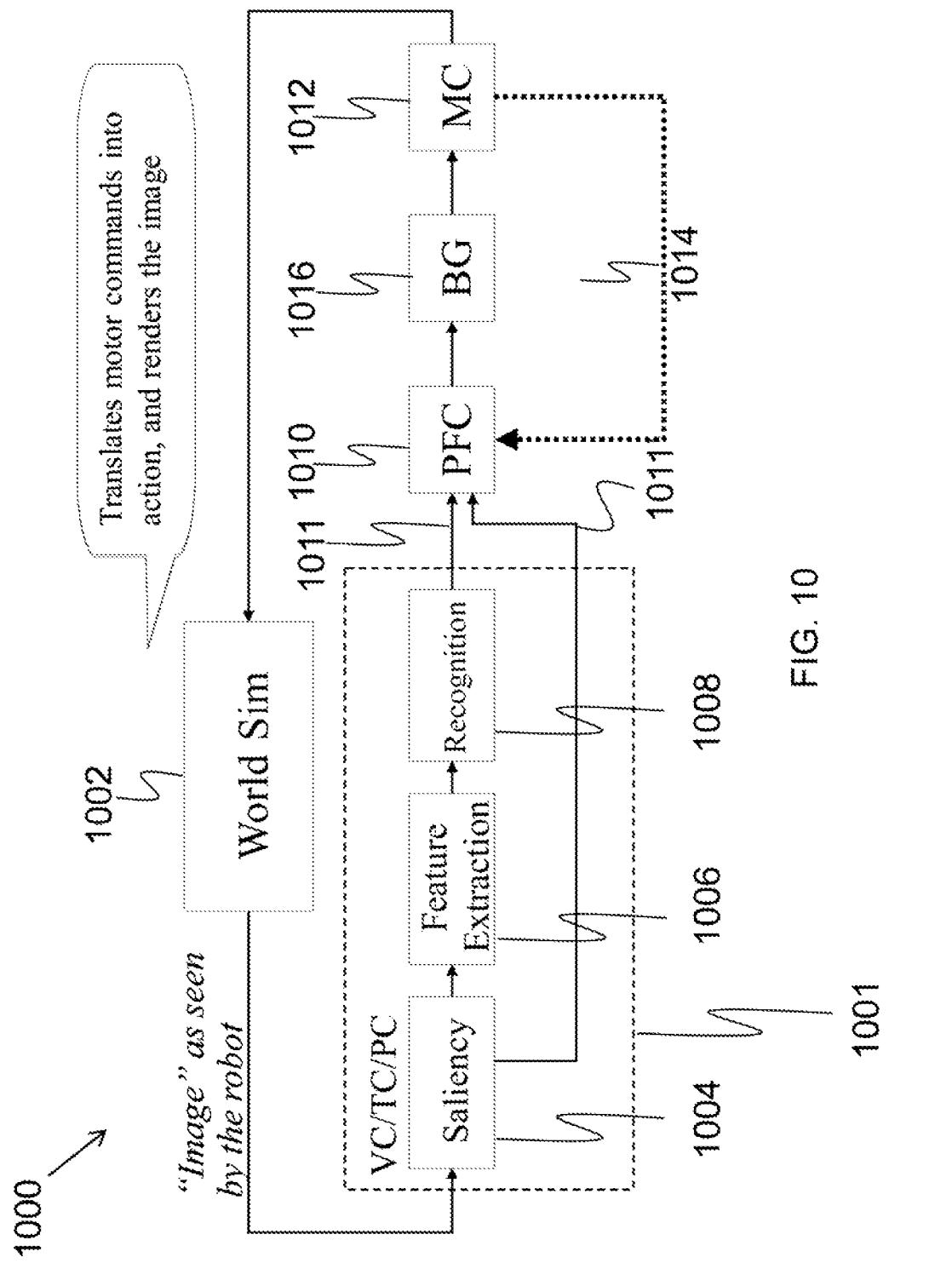
FIG. 10 is a diagram of a prototype implementation according to the present invention.
Figure 11:
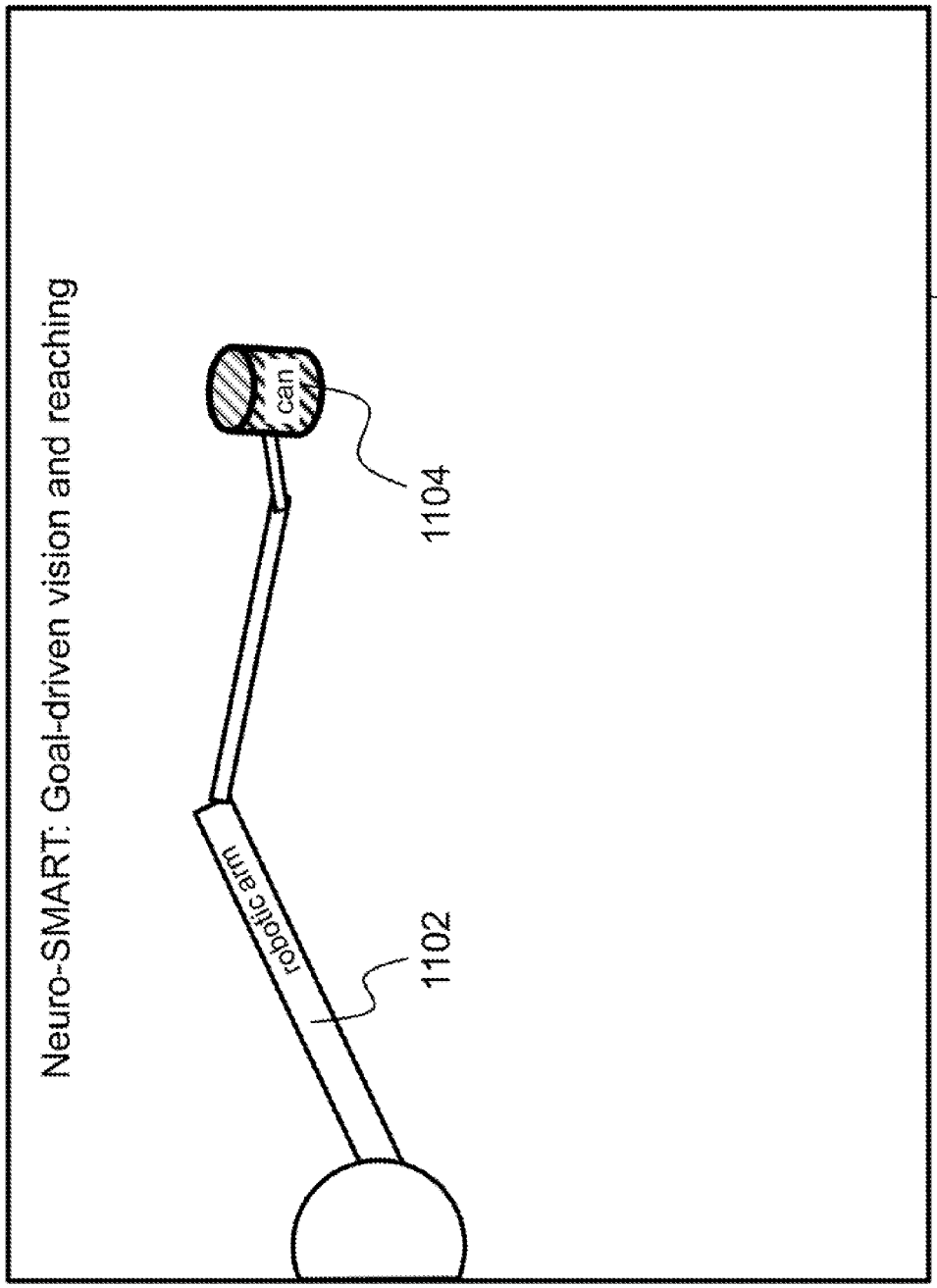
FIG. 11 is an illustration of a screen shot of a world simulator as related to the architecture of the present invention.

In the example illustrated in FIGS. 10 and 11, the code is necessary to initialize the BLB, the communication layer and wrappers for actual modules that implement each function. As a non-limiting example and as used in the prototype of FIGS. 10 and 11, an example of code that will "initialize the BLB and communication layer" is given below:

void BICA_Start(BICA_ty_init* init, BICA_ty_grp * join_groups, int
num_join_groups, bool notify_controller) {
    // Initialize the module
    BICA_Initialize(init);
    // Join the group this module belongs to
    for (i=0; i<num_join_groups; i++) BICA_Join(join_groups[i]);
    // Notify controller
    if (notify_controller) {
        i=strlen(init->BICA_name)+1;
        BICA_Send(GRP_CTRL, init->BICA_name, i);
    }
}

Each wrapper serves as interface between the implementation of a functional module and the rest of the system, and contains a communication layer that provides the implementation code module a communication-independent interface to the underlying communication implementation (e.g., the code module implementing VC does not need to know if the communication is based on PVM or MPI). An example of the module wrapper code for the Basal Ganglia (BG)

module that was used in the prototype (i.e., the robot arm depicted in FIG. 11) is given below.

```
/*
 * Implements the wrapper for the BG "box" for the direct
     reaching demo.
 *
 */
#include "BICAdirect_internal.h"
int main(int argc, char **argv) {
    . . .
// Start the module PFC
    BICA_Start(BICA_Simple_Init("PFC"), my_groups,
sizeof(my_groups)/sizeof(BICA_ty_grp), true);
// Receive data
    num_received=BICA_Receive(GRP_WHAT_WHERE,
        &what_where, sizeof(what_where));
    . . .
    while     (num_received==sizeof(what_where)+sizeof
        (joints)+sizeof(locked)) {
// Call the actual implementation module for PFC:
    pfc_core(what_where, joints, locked, joint_deltas);
// Send results out
    BICA_Send(GRP_RAW_DELTAS, joint_deltas, sizeof
        (joint_deltas));
    }
// Clean up:
    . . .
    }
    return 0;
}
```

With respect to filling the module wrapper code with implementation code, this can be done using standard C/C++ code that performs various functions, or any other suitable language. Provided below is a skeleton of the final module wrapper code that was used in the prototype illustrated in FIGS. 10 and 11. Note that the statement "the actual implementation of the pfc module" is where a user will insert the code that implements PFC functionality and can be an existing library of software for various modules that someone has written. It is straightforward C/C+ code (but not limited to that, as one can write in Java or other languages). The code is provided as:

```
/*
 * Implements the PFC core algorithm for the direct
     reaching
 * with on-line learning and "babbling".
 */
#include "BICA direct internal.h"
#include "pinv.h"
. . .
void pfc_core (
    ty_what_where what_where, /* In: the "what/where" data
        (as defined in BICAdirect_comm.h) */
    ty_joint_data joints, /* In: joint angles (from simulator) */
    ty_joint_state locked, /* In: joint state (from MC) */
    ty_joint_data joint_deltas /* Out: joint control */
) {
// The actual implementation of pfc module
}
```

The BrainML compiler also generates a build specification 740 that is needed by build tools 790 to compile and link all functional modules into a single software code (BLB). The build tool 790 generates the single software code (BLB) 710 using the filled wrapper code, the communication code, initialization code, and build specification. Once the system has all of the above (e.g., the code provided above and below and any other needed information), the BLB can be generated by running "omake" to compile and build the software executable. Omake is publicly available as a software tool.

To create a suitable BrainML compiler 770 and checker 760, a plurality of acts are performed. The acts for creating a suitable BrainML compiler 770 and checker 760 include;

1. Implementing a parser and syntax checker for the grammar developed above in act 4 of the method for creating a suitable BrainML language;
2. Formulating the consistency criteria for BrainML specifications (e.g., the module specifications have to match the channel specifications, each module should have at least one primary input channel and at least one output channel, and so on).
3. Implementing a checker for the consistency criteria formulated in act 2 above.
4. Implementing a compiler module that takes the specifications of the data formats for a specific module and creates a C/C++ "stub" header for the appropriate "compute" function.
5. Implementing a compiler module that would take a C/C++ "stub" header (as generated by the compiler module developed in the previous task) and fill it with a MeX (Matlab eXchange) wrapper that would allow implementing the compute function in Matlab. Matlab is userful to allow prototyping new experimental algorithms.
6. Implementing a compiler module capable of generating control code for a module. The control code would need to include:
    a. The code for starting up the module;
    b. The code for establishing all the appropriate input/output channels;
    c. The code that would monitor input channels for data, copying the received data into appropriate memory locations and then performing the appropriate operation (which, based on the BrainML specification for that module may include aborting the currently executing compute function, invoking an appropriate compute function, and so on). This code will be multithreaded with separate threads performing the input/output (I/O) and the requisite computations;
    d. The code that would take the data returned by a compute function and would then send it to the appropriate output channel(s).
7. Implementing a compiler module that would output the build specifications needed in order to compile and link all the relevant components into an actual BLB. As mentioned above, off-the-shelf build tool can be used, such as GNU Make or OMake, for performing the actual build of the BLB binaries.
8. Extending the compiler modules developed in acts 3 through 5 to support not only the "compute" functions over regular data channels, but also "control" functions over control channels. For example, this would include supporting establishing a channel to an (optional) BLB controller tool and creating stubs for functions like "dump the current trained state of the module to a file" and "load a trained state of the module from a file."
9. Adding a compiler module that would generate (optional) code that would collect statistics, debugging and visualization data in a running module and send that data to the (optional) visualization module at a regular intervals.
10. Adding a compiler module that would generate code for the control and visualization module (which will work in concert with the graphical user interface described below).

(5.2.2.3) Graphical BrainML Editor and Visualization Tools

While the BrainML specifications are designed so that it is easy to create and manipulate them by hand (which might be sufficient for a lightweight BICA-SMART), a complete BICA-SMART contains an integrated graphical visualization tool that can be used to:
1. Visualize the structure of the BLB defined by a BrainML specification.
2. Manipulate the BrainML specifications, refining and updating it.
3. Control the checking and compilation process for the BrainML specifications.
4. Perform high-level controls of BICA simulations (start/stop, pause/resume, rewind, save/load current state).
5. Force a controlled degradation in the performance of specified modules (up to and including a complete shutdown of a module) as needed to perform lesion studies on the BLB.
6. Collect and visualize statistics, as the BLB is running, facilitating debugging, performance evaluations, and lesion studies.

Further, the graphical configuration tool is operable for converting the description into a graphical layout of the architecture. The graphical layout uses the BrainML to specify information about the functional modules and the data flows between the functional modules and generate a single BrainML file describing the architecture.

(5.2.2.4) BICA-Comm API and Implementation

BICA-SMART includes a simple abstract application programming interface (API) for the low-level communication in BLB ("BICA-Comm API" 780). The main goals of the BICA-Comm API 780 include:
1. Provide the means of data communication and control of the BLB modules;
2. Support the BICA-SMART aim at high levels of modularity and concern separation (as outlined earlier);
3. Provide support for highly distributed and highly parallel BLBs;
4. Provide an interface that allows transparently swapping in various implementations—ranging from, for example, a quick serialized prototype utilizing an off-the-shelf communication library to a highly optimized parallelized and distributed one fine-tuned for a particular hardware platform. The abstract BICA-Comm API 780 would ensure that such implementations may be swapped for one another without having to change any code outside of the BICA-Comm API 780 itself. The communication library effectively generates the implementation code to fill the module wrapper code and generate a filled wrapper code.

Thus, the BICA-Comm API 780 generates a communication style for data flow between the functional modules of the architecture. The communication style is an implementation of the communication that includes generated communication code 785 to support the communication style.

In the prototype example illustrated in FIGS. 10 and 11, the communication style is implemented using a PVM group communication service. Provided below is a specific implementation of the communication using PVM. The code provided below is a skeleton of the communication code (the actual code would be filled in between the curly brackets for each function, such as BICA_Join, BICA_Send, etc.). Note that communication style refers to how the modules will talk to each other—a non-limiting example of which includes using standard tools such as PVM group communication service. The communication code is written and generated using standard syntax from the communication style (e.g., PVM service), which is clearly understood by one skilled in the art (e.g., an artisan familiar with C/C++ code. The example communication code is as follows:

```
void BICA_Join(BICA_ty_grp group) {
    // Code for a module to join a group in PVM
}
void BICA_Send(BICA_ty_grp group, const void *data, int dataSize) {
    // Send data to a given group using PVM
}
int BICA_Receive(BICA_ty_grp group, void *data, int dataSize) {
    // Request data from a given group using PVM
}
```

As explained earlier, the distinction between the primary and auxiliary channels exists only at the receiving module, while the sending module does not need to be concerned about it. Similarly, one of the main design principles of the BICA-Comm API 780 is that the sending module implementation does not need to know which modules will want to receive the data it generates, where those modules are located, and so on. In order to support self-optimization and run-time reconfiguration to the maximal extent possible, it is desirable to have an implementation where the nature and location of the receiving modules may change dynamically over time.

These goals and requirements made the reliable group communication paradigm a natural choice for the BICA-Comm API 780. In a group communication systems, processes form "groups" (where any process is free to join (and leave) any groups it wishes at any point). A sender of a message would simply direct its messages to a specific group and the underlying group communication system would make sure that all the current members of the corresponding group would receive that message. In general, the sender does not need to know anything about a group, other than its name. This way, a visual object classification module may send its output to a group named "visual object classification" and all the modules that are interested in receiving such output will only need to join that group in order to start receiving the classification data.

Following the choice to use the reliable group communication paradigm, the BICA-Comm API 780 includes the usual group communication operations—"join the group," "send a message to a group," "receive a message sent to a specific group," etc.

There are a number of off-the-shelf implementations of the group communication paradigm (for example, the group communication layer in the parallel virtual machine (PVM)), which make it easy to implement quick prototypes of the BICA-Comm API 780. PVM is a software package that permits a heterogeneous collection of Unix and/or Windows computers hooked together by a network to be used as a single large parallel computer. Thus, large computational problems can be solved more cost effectively by using the aggregate power and memory of many computers. The software is very portable and is available through the netlib repository.

To create a complete BICA-Comm API 780, a plurality of acts are performed. The acts for creating a complete BICA-Comm API 780 include:
1. Defining the core BICA-Comm API 780 using the group communication style as needed to support the control and data flows.

2. Creating a prototype implementation of the core API using a simple off-the-shelf communication library (e.g., PVM).
3. As more of the BICA-SMART is implemented and partial BLB become available for experimentation, measuring the performance of the prototype implementation and identifying the bottlenecks.
4. Based on the performance data collected in the previous task, creating an optimized implementation of the API and extending the API as needed to increase performance.
5. Extending the API to support distributed module implementations. This may include adding a group communication variant that provides strong serializability and message ordering guarantees across processes and across groups. Creating an optimized implementation of the new API.
6. Adding support for self-optimization and protocol migration and implementing appropriate self-optimization heuristics.

(5.2.3) Experimental Results

A simplified version of the BLB has been implemented and tested. The BLB included:
1. A BICA-Comm prototype, implemented using the PVM group communication service;
2. A collection of functional modules implementing biologically inspired motor controls;
3. A simple graphical interface; and
4. A modular cross-platform build specification for the OMake build tool.

One of the main goals of this prototype implementation was to test the process of embedding the biologically inspired vision and control algorithms into the BICA-SMART framework. The prototype included a simulated environment where the BLB learned (on-line) how to control a simple robotic arm in order to reach a given goal in a two-dimensional (2D) space. In other words, a prototype was generated that simulated the control of a robotic arm.

A structural overview of the prototype implementation 1000 is shown in FIG. 10. The prototype implementation 1000 includes a "world simulator" 1002 that receives the motor controls from the BLB, translates them into the actions and renders a simple 2D view of a "robotic arm." The world simulator 1002 also acts as the graphical interface, providing the visualization and control capabilities.

FIG. 11 is an illustrative example of a screen shot 1100 of the world simulator in action, depicting the "robotic arm" 1102 with a goal to view and reach a can 1104. Referring again to FIG. 10, the figure illustrates a simple BLB sub-architecture having a set of functional modules with data flows specified between functional modules. Note that VC, TC, PC, BG, PFC and MC are all modules that are also in the full brain BICA-LEAP architecture shown in FIG. 3 (For example, MC=[Eye/head, limbs, mouth] at the bottom, right-side of FIG. 3). FIG. 10 is a subset of this architecture that processes visual information to recognize specific object(s) in an image (scene) and commands to move the motor system (limbs) towards the object(s). For example, VC does saliency computation, TC does feature extraction, and PC does Object Recognition. In this example, the motor commands are the robot arm new joint angles (computed from current joint angles and the adjusted joint angles from the BG) to move in 2D Cartesian space. The robot arm has 3 links and 3 joint angles (in-plane). These 3 joint angles are adjusted as the robot moves towards goal objects(s).

For further explanation, the image on the world simulator (of FIG. 11) is passed (over a primary BICA-Comm API channel) to the saliency module 1004 that finds the salient points of the image. For each salient point, the saliency module 1004 computes the point's coordinates and extracts a portion of the image at those coordinates.

The visual processing can be done in a monolithic fashion (one big visual processing module 1001) or through three separate submodules (i.e., the salience module 1004, the feature extraction module 1006, and the recognition module 1008). Thus, a user can refine a big module 1001, replacing it with a collection of smaller submodules.

The sub-images generated by the saliency module 1004 are then passed to a feature extraction module 1006 over a primary BICA-Comm API channel. The feature extraction module 1006 is configured generate feature vectors that represent relative weights of the features in the input image. A non-limiting example of such a feature extraction module 1006 is described in U.S. patent application Ser. No. 11/973,161, filed Oct. 4, 2007, entitled, "Visual Attention and Object Recognition System," which is incorporated by reference as though fully set forth herein. As another non-limiting example, oriented Gabor filters are a traditional choice for obtaining localized frequency information and they have been widely used to model the receptive fields of simple cells. While popular, Gabor filters have two main limitations. The maximum bandwidth of a Gabor filter is limited to approximately one octave and Gabor filters are not optimal if one is seeking broad spectral information with maximal spatial localization. These problems can be eliminated through the use of the Log-Gabor function, which can be constructed with arbitrary bandwidth and the bandwidth can be optimized to produce a filter with minimal spatial extent. For less than one octave, the shapes of Log-Gabor and Gabor functions are virtually identical. Additionally, Log-Gabor filters provide a better description of simple cell receptive fields. The present invention uses a bank of Log-Gabor filters at different resolutions and orientations to extract a variety of simple shape features from the input. Using the output of the filter bank, feature combinations are extracted using spatial pyramid matching (see literature reference no. 26). This approach partitions the extracted Log-Gabor features into increasingly fine subregions and computes conjunctions of the features in each region using histograms.

The feature vectors generated by the feature extraction module 1006 are then passed over a primary BICA-Comm API channel to a recognition module 1008 that operates as an object classifier. Using the feature vectors, the recognition module 1008 is able to classify the object. A non-limiting example of such a recognition module is described in U.S. patent application Ser. No. 11/973,161. The recognition/classification module uses the k-Nearest Neighbor (KNN) to learn data. This is an online classifier, meaning, it can easily learn additional data without extensive retraining. For classification, the neighbors that are within a certain distance of the input are identified. If these neighbors mostly agree, then the same class of the majority of neighbors is ascribed to the input. If the neighbors do not predominantly contain one particular class, then these neighbors are used to train a support vector machine (SVM) using the one-versus-all rule on the fly (or using a cached one if possible), which is used to classify the data. By combining KNN and SVM in a way similar to that of Zhang et al. (see literature reference no. 27), the present invention can achieve fast, accurate, and online classification. The functionality of the KNN algorithm is similar to that of a region of primate inferotemporal cortex (IT) called TEQ, which is very active during initial object classification. A region of IT called TE appears to perform fine-grained object classification, slightly after the activation of TEO, which is functionally similar to the SVM component of the present invention.

The coordinates of the salient points from the saliency module 1004 and the corresponding results of the recognition module 1008 (that would output either "goal," or "hand," or "not recognized") are passed to a prefrontal cortex (PFC) module 1010 over two primary BICA-Comm API channels 1011 and 1011'. The two channels 1011 and 1011' are coupled so that the PFC module 1010 would only be activated upon receiving inputs on both of the channels. The PFC module 1010 also receives the current joint angles from a motor cortex (MC) module 1012 over an auxiliary channel 1014. Based on these inputs, the PFC module 1010 then performs the following operations:

1. Updates the learned map from the joint angle positions and joint angle deltas to hand position deltas;
2. If the goal is present, computes (based on the learned map) the joint angles that are needed to reach the goal; and
3. Tracks the progress in reaching the goal; if it notices that no sufficient progress have been made; it enters the "babble" mode, where it moves the robotic hand in a biologically inspired somewhat random pattern to learn a more accurate map before returning to the "try to reach the goal" mode again.

Another module, the basal ganglia (BG) module 1016, receives the angle deltas from the PFC module 1010 (over a primary BICA-Comm API channel) and computes the "Go" signal, which acts as a multiplier for the deltas. The MC module 1012 then receives the adjusted joint angles from the BG module 1016 (over a primary BICA-Comm API channel) and computes the new joint positions (taking into account joint limits, and other factors) and sends them both to the PFC module 1010 (over the auxiliary channel already mentioned above) and to the world simulator 1002 (over a primary channel).

Several variations of the present invention have been tested. The simplest version had only the PFC module 1010, the BG module 1016, the MC module 1012, and the world simulator module 1002. In this aspect, the world simulator module 1002 sends the hand and goal coordinates directly to the PFC module 1010, bypassing any attempt at visual recognition. Another version of the present invention included a preliminary version for the saliency code module 1004, as well as "stub" versions mimicking the expected computational complexity of the feature extraction module 1006 and the object classification module 1008. The proper versions of the feature extraction module 1006 and object classification module 1008 were also implemented.

The different prototypes were tested under a variety of conditions, including running all the modules in parallel on a single computer, running a distributed version where every module is running on a separate computer, and variations therebetween. It was observed that the overall BICA-Comm-based communication and control infrastructure performs well and delivers all the expected benefits both from the standpoint of the ease of implementation of the functional modules and from the point of providing effective decentralized asynchronous communication and control functionality for the prototype.

It was also observed that the framework works well under various conditions. Different initialization approaches provide flexibility in choosing different levels of parallelization "depth" for the prototype. For example, if the prototype is initialized and started up by introducing a single message on the "MC to Word Simulator" channel, then the prototype would work in a mostly synchronous manner, where only one module would be active at a time. This mode of operation is particularly useful for debugging.

Additionally, if more than one message (e.g., three messages) is introduced on the "MC to World Simulator" channel at startup, then the prototype would have several modules running in parallel most of the time. This results in significantly decreased delays (in fact, it was observed that in this mode the world simulator module 1002 was busy almost all the time, which means that it almost never had to wait for the BLB) and significantly increased throughput of the prototype. One potential downside to the increased asynchrony introduced by this initialization approach is that some of the modules (mainly the PFC module 1010) end up computing based on data that might be slightly out of date and potentially slightly out-of-sync. It was also noted that the biologically inspired algorithms tolerate this well.

Figure 12:
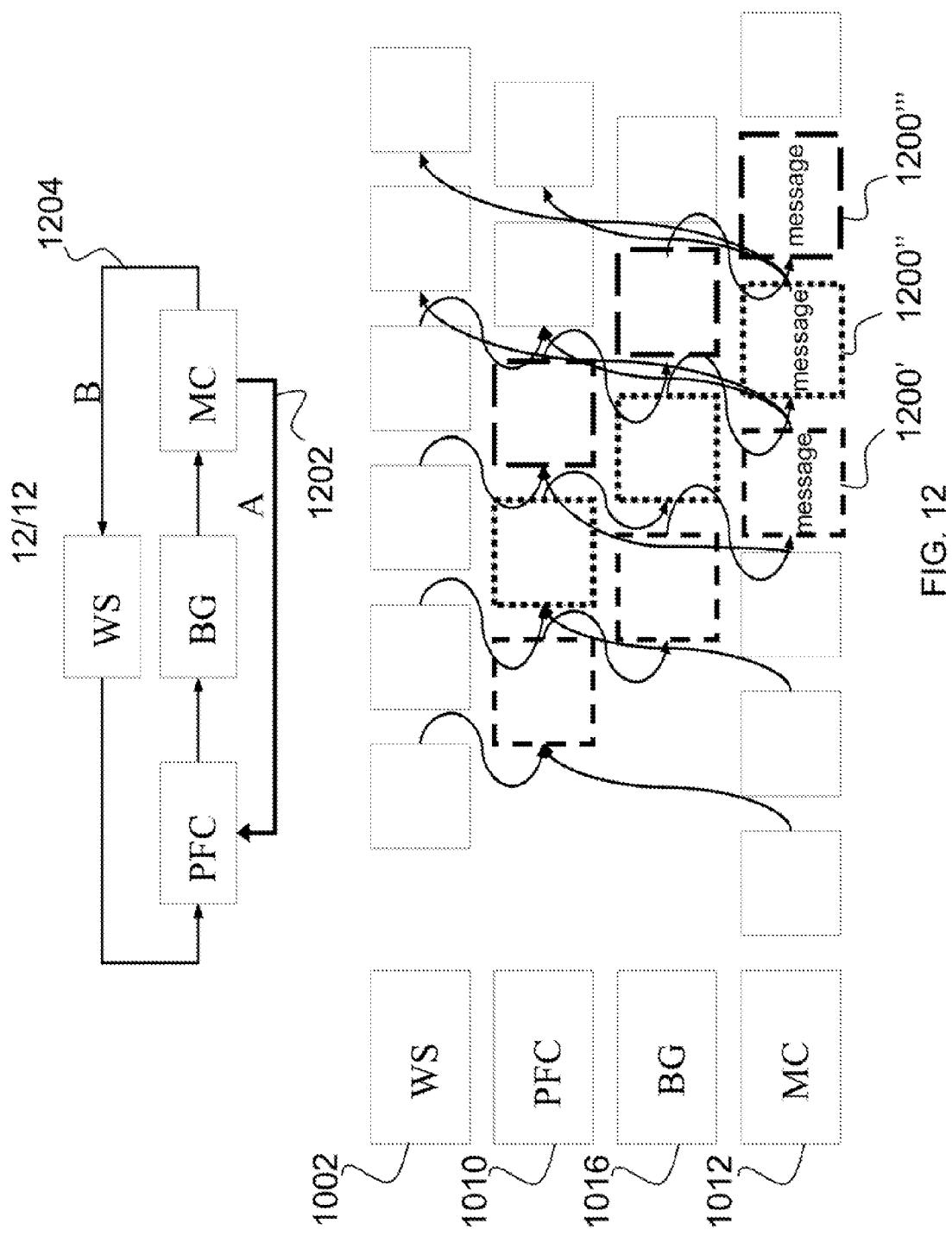
FIG. 12 is an illustration of a form of pipelining according to the present invention.

The asynchronous execution is illustrated in FIG. 12. The asynchronous execution (which is enabled by initializing the system with three messages 1200', 1200", and 1200''' on channels A 1202 and B 1204) is a form of pipelining, where different modules (i.e., the PFC module 1010, the BG module 1016, the MC module 1012, and the world simulator module 1002) work in parallel based on the data generated during a few of the recent "time steps". The ability to pipeline the execution, as demonstrated by this prototype, is also a fundamental property of BICA-SMART.

The invention claimed is:

1. A method for generating a single software code based on a description of a distributed architecture, comprising acts of:
    receiving a description of an architecture having a set of functional modules with data flows specified between the functional modules, the data flows having data flow specifications;
    using one or more processors to perform operations of:
        generating a distributed architecture description language file describing the architecture such that the distributed architecture description language file contains descriptions of data event-driven functional modules;
        generating code for each functional module that includes:
            initialization code having code selected from a group consisting of code for starting the functional module, code for communicating with other functional modules, and code for controlling the functional module; and
            module wrapper code to be subsequently filled with implementation code;
        generating a build specification that is needed by build tools to compile and link all functional modules into a single software code;
        describing a communication style to functionally specify data flow between the functional modules of the architecture and generating communication code to support the communication style;
        filling the module wrapper code with implementation code to create a filled wrapper code;
        generating the single software code using the filled wrapper code, the communication code, initialization code, and build specification; and
        affixing the single software code on a computer-readable medium as instruction means that are executable by a computer; and
        converting the description into a graphical layout of the architecture, the graphical layout using the distributed architecture description language to specify information about the functional modules and the data flows between the functional modules.

2. A method as set forth in claim 1, further comprising an act of using one or more processors to perform operations of controlling, executing, and debugging the single software code.

3. A method as set forth in claim 2, further comprising an act of using one or more processors to perform an operation of generating code for collecting and visualizing statistics as the single software code is running to facilitate debugging and performance evaluations.

4. A method as set forth in claim 3, wherein receiving a description of an architecture having a set of functional modules with data flows specified between the functional modules, the function modules include:
  primary input and auxiliary input channels and primary output and auxiliary output channels;
    wherein arrival of new data on a primary input channel causes the functional module to initiate a compute function and perform a round of computation on the new data; and
    wherein arrival of new data on an auxiliary channel is saved and utilized later when a new round of computation is triggered by an input arriving on a primary input channel.

5. A method as set forth in claim 4, further comprising an act of using one or more processors to perform operations of:
  implementing a parser and syntax checker;
  formulating consistency criteria for determining if all the data flows for each of the functional modules are satisfied, where consistency criteria includes a presence of a primary input channel in each functional module;
  implementing a checker for the consistency criteria; and
  implementing a compiler module that takes the data flow specifications for a specific functional module and creates a "stub" header for an appropriate "compute" function.

6. A method for generating a single software code based on a description of a distributed architecture, comprising acts of:
  receiving a description of an architecture having a set of functional modules with data flows specified between the functional modules, the data flows having data flow specifications;
  using one or more processors to perform operations of:
    generating a distributed architecture description language file describing the architecture such that the distributed architecture description language file contains descriptions of data event-driven functional modules;
    generating code for each functional module that includes:
      initialization code having code selected from a group consisting of code for starting the functional module, code for communicating with other functional modules, and code for controlling the functional module; and
      module wrapper code to be subsequently filled with implementation code;
    generating a build specification that is needed by build tools to compile and link all functional modules into a single software code;
    describing a communication style to functionally specify data flow between the functional modules of the architecture and generating communication code to support the communication style;
    filling the module wrapper code with implementation code to create a filled wrapper code;
    generating the single software code using the filled wrapper code, the communication code, initialization code, and build specification; and
    affixing the single software code on a computer-readable medium as instruction means that are executable by a computer; and
  wherein receiving a description of an architecture having a set of functional modules with data flows specified between the functional modules, the function modules include:
  primary input and auxiliary input channels and primary output and auxiliary output channels;
    wherein arrival of new data on a primary input channel causes the functional module to initiate a compute function and perform a round of computation on the new data; and
    wherein arrival of new data on an auxiliary channel is saved and utilized later when a new round of computation is triggered by an input arriving on a primary input channel.

7. A system for generating a single software code based on a description of a distributed architecture having a set of functional modules with data flows, having data flow specifications, specified between the functional modules, the system comprising one or more processors configured to perform operations of:
  generating a distributed architecture description language file describing the architecture such that the distributed architecture description language file contains descriptions of data event-driven functional modules;
  generating code for each functional module that includes:
    initialization code having code selected from a group consisting of code for starting the functional module, code for communicating with other functional modules, and code for controlling the functional module; and
    module wrapper code to be subsequently filled with implementation code;
  generating a build specification that is needed by build tools to compile and link all functional modules into a single software code;
  describing a communication style to functionally specify data flow between the functional modules of the architecture and generating communication code to support the communication style;
  filling the module wrapper code with implementation code to create a filled wrapper code;
  generating the single software code using the filled wrapper code, the communication code, initialization code, and build specification;
  affixing the single software code on a computer-readable medium as instruction means that are executable by a computer; and
  converting the description into a graphical layout of the architecture, the graphical layout using the distributed architecture description language to specify information about the functional modules and the data flows between the functional modules.

8. A system as set forth in claim 7, wherein the one or more processors are further configured to perform operations of controlling, executing, and debugging the single software code.

9. A system as set forth in claim 8, wherein the one or more processors are further configured to perform an operation of generating code for collecting and visualizing statistics as the single software code is running to facilitate debugging and performance evaluations.

10. A system as set forth in claim 9, wherein receiving a description of an architecture having a set of functional modules with data flows specified between the functional modules, the function modules include:
primary input and auxiliary input channels and primary output and auxiliary output channels;
wherein arrival of new data on a primary input channel causes the functional module to initiate a compute function and perform a round of computation on the new data; and
wherein arrival of new data on an auxiliary channel is saved and utilized later when a new round of computation is triggered by an input arriving on a primary input channel.

11. A system as set forth in claim 10, wherein the one or more processors are further configured to perform operations of:
implementing a parser and syntax checker;
formulating consistency criteria for determining if all the data flows for each of the functional modules are satisfied, where consistency criteria includes a presence of a primary input channel in each functional module;
implementing a checker for the consistency criteria; and
implementing a compiler module that takes the data flow specifications for a specific functional module and creates a "stub" header for an appropriate "compute" function.

12. A system for generating a single software code based on a description of a distributed architecture having a set of functional modules with data flows, having data flow specifications, specified between the functional modules, the system comprising one or more processors configured to perform operations of:
generating a distributed architecture description language file describing the architecture such that the distributed architecture description language file contains descriptions of data event-driven functional modules;
generating code for each functional module that includes:
initialization code having code selected from a group consisting of code for starting the functional module, code for communicating with other functional modules, and code for controlling the functional module; and
module wrapper code to be subsequently filled with implementation code;
generating a build specification that is needed by build tools to compile and link all functional modules into a single software code;
describing a communication style to functionally specify data flow between the functional modules of the architecture and generating communication code to support the communication style;
filling the module wrapper code with implementation code to create a filled wrapper code;
generating the single software code using the filled wrapper code, the communication code, initialization code, and build specification;
affixing the single software code on a computer-readable medium as instruction means that are executable by a computer; and
wherein receiving a description of an architecture having a set of functional modules with data flows specified between the functional modules, the function modules include:
primary input and auxiliary input channels and primary output and auxiliary output channels;
wherein arrival of new data on a primary input channel causes the functional module to initiate a compute function and perform a round of computation on the new data; and
wherein arrival of new data on an auxiliary channel is saved and utilized later when a new round of computation is triggered by an input arriving on a primary input channel.

13. A computer program product for generating a single software code based on a description of a distributed architecture having a set of functional modules with data flows, having data flow specifications, specified between the functional modules, the computer program product comprising computer-readable instruction means stored on a non-transitory computer-readable medium that are executable by a computer having a processor for causing the processor to perform operations of:
generating a distributed architecture description language file describing the architecture such that the distributed architecture description language file contains descriptions of data event-driven functional modules;
generating code for each functional module that includes:
initialization code having code selected from a group consisting of code for starting the functional module, code for communicating with other functional modules, and code for controlling the functional module; and
module wrapper code to be subsequently filled with implementation code;
generating a build specification that is needed by build tools to compile and link all functional modules into a single software code;
describing a communication style to functionally specify data flow between the functional modules of the architecture and generating communication code to support the communication style;
filling the module wrapper code with implementation code to create a filled wrapper code;
generating the single software code using the filled wrapper code, the communication code, initialization code, and build specification; and
converting the description into a graphical layout of the architecture, the graphical layout using the distributed architecture description language to specify information about the functional modules and the data flows between the functional modules.

14. A computer program product as set forth in claim 13, further comprising instruction means for causing the processor to perform operations of controlling, executing, and debugging the single software code.

15. A computer program product as set forth in claim 14, further comprising instruction means for causing the processor to perform an operation of generating code for collecting and visualizing statistics as the single software code is running to facilitate debugging and performance evaluations.

16. A computer program product as set forth in claim 15, wherein receiving a description of an architecture having a set of functional modules with data flows specified between the functional modules, the function modules include:
primary input and auxiliary input channels and primary output and auxiliary output channels;

wherein arrival of new data on a primary input channel causes the functional module to initiate a compute function and perform a round of computation on the new data; and wherein arrival of new data on an auxiliary channel is saved and utilized later when a new round of computation is triggered by an input arriving on a primary input channel.

17. A computer program product as set forth in claim 16, further comprising instruction means for causing the processor to perform operations of:

implementing a parser and syntax checker;

formulating consistency criteria for determining if all the data flows for each of the functional modules are satisfied, where consistency criteria includes a presence of a primary input channel in each functional module;

implementing a checker for the consistency criteria; and implementing a compiler module that takes the data flow specifications for a specific functional module and creates a "stub" header for an appropriate "compute" function.

18. A computer program product for generating a single software code based on a description of a distributed architecture having a set of functional modules with data flows, having data flow specifications, specified between the functional modules, the computer program product comprising computer-readable instruction means stored on a non-transitory computer-readable medium that are executable by a computer having a processor for causing the processor to perform operations of:

generating a distributed architecture description language file describing the architecture such that the distributed architecture description language file contains descriptions of data event-driven functional modules;

generating code for each functional module that includes:
initialization code having code selected from a group consisting of code for starting the functional module, code for communicating with other functional modules, and code for controlling the functional module; and module wrapper code to be subsequently filled with implementation code;

generating a build specification that is needed by build tools to compile and link all functional modules into a single software code;

describing a communication style to functionally specify data flow between the functional modules of the architecture and generating communication code to support the communication style;

filling the module wrapper code with implementation code to create a filled wrapper code;

generating the single software code using the filled wrapper code, the communication code, initialization code, and build specification; and wherein receiving a description of an architecture having a set of functional modules with data flows specified between the functional modules, the function modules include:

primary input and auxiliary input channels and primary output and auxiliary output channels;

wherein arrival of new data on a primary input channel causes the functional module to initiate a compute function and perform a round of computation on the new data; and wherein arrival of new data on an auxiliary channel is saved and utilized later when a new round of computation is triggered by an input arriving on a primary input channel.

* * * * *